United States Patent
Sotos et al.

(10) Patent No.: US 8,832,850 B2
(45) Date of Patent: Sep. 9, 2014

(54) DEVICE, METHOD, AND SYSTEM FOR SECURE MOBILE DATA STORAGE

(71) Applicants: Ilias P. Sotos, Greenwood, IN (US); Sean K. Miller, Greenwood, IN (US)

(72) Inventors: Ilias P. Sotos, Greenwood, IN (US); Sean K. Miller, Greenwood, IN (US)

(73) Assignee: Monolith Innovations, LLC, Greenwood, IN (US)

( * ) Notice: Subject to any disclaimer, the term of this patent is extended or adjusted under 35 U.S.C. 154(b) by 0 days.

(21) Appl. No.: 13/780,144

(22) Filed: Feb. 28, 2013

(65) Prior Publication Data

US 2013/0227703 A1    Aug. 29, 2013

Related U.S. Application Data

(63) Continuation of application No. 13/404,904, filed on Feb. 24, 2012, now Pat. No. 8,407,759.

(51) Int. Cl.
*H04L 29/06* (2006.01)
*G06F 7/04* (2006.01)
*G06F 17/30* (2006.01)
*H04N 7/16* (2011.01)

(52) U.S. Cl.
USPC ............ 726/26; 726/1; 370/328; 370/468

(58) Field of Classification Search
None
See application file for complete search history.

(56) References Cited

U.S. PATENT DOCUMENTS

| | | |
|---|---|---|
| 7,054,594 B2 | 5/2006 | Bloch et al. |
| 7,158,756 B2 * | 1/2007 | Palin et al. ............... 455/41.2 |
| 7,212,785 B2 * | 5/2007 | Brassil et al. ............. 455/41.2 |
| 7,266,365 B2 | 9/2007 | Ferguson et al. |
| 7,319,865 B2 | 1/2008 | Henrick |
| 7,415,588 B2 | 8/2008 | Hong et al. |
| 7,477,890 B1 | 1/2009 | Narayanaswami |
| 7,600,000 B2 | 10/2009 | Yao et al. |
| 7,792,799 B2 | 9/2010 | Craswell et al. |
| 7,870,315 B2 | 1/2011 | Moon |
| 7,890,661 B2 | 2/2011 | Spurgat et al. |
| 7,899,397 B2 | 3/2011 | Kumar |
| 7,899,662 B2 | 3/2011 | Brunet et al. |
| 7,941,167 B2 | 5/2011 | Xu et al. |
| 8,160,097 B2 * | 4/2012 | Cadieux ................... 370/468 |
| 8,407,759 B1 | 3/2013 | Sotos et al. |
| 2002/0093956 A1 * | 7/2002 | Gurin ...................... 370/389 |
| 2003/0023673 A1 | 1/2003 | Tso |

(Continued)

OTHER PUBLICATIONS

Sticky Technology, Ltd., "Sticky," available at <http://www.stickytec.com/>, printed Feb. 24, 2012, 1 page.

*Primary Examiner* — Shin-Hon Chen
(74) *Attorney, Agent, or Firm* — Barnes & Thornburg LLP

(57) ABSTRACT

A device, method, and system for secure mobile data storage includes a mobile data storage device having a short-range communication circuit, a long-range communication circuit, and a data storage for storing data. The mobile data storage device is used to store data used by a paired mobile communication device. The mobile data storage device and the mobile communication device communicate control signals over a wireless control link established using the short-range communication circuit and data over a wireless data link, different from the wireless control link, established using the long-range communication circuit. The mobile data storage device and/or mobile communication device may monitor a distance between the devices and perform a security function in response the devices being separated from each other. The mobile data storage device may backup data on a remote data server and/or repopulate data from the remote data server using the mobile communication device.

17 Claims, 25 Drawing Sheets

(56) References Cited

U.S. PATENT DOCUMENTS

| | | |
|---|---|---|
| 2003/0109218 A1 | 6/2003 | Pourkeramati et al. |
| 2005/0073991 A1 | 4/2005 | Roberts et al. |
| 2006/0057960 A1 | 3/2006 | Tran |
| 2006/0240806 A1 | 10/2006 | Demirbasa et al. |
| 2007/0010256 A1* | 1/2007 | Klabunde et al. ........... 455/452.2 |
| 2008/0014869 A1 | 1/2008 | Demirbasa et al. |
| 2008/0057867 A1* | 3/2008 | Trappeniers et al. ........ 455/41.2 |
| 2008/0154989 A1 | 6/2008 | Arman |
| 2008/0248801 A1* | 10/2008 | Fletcher et al. ............. 455/435.2 |
| 2009/0006846 A1* | 1/2009 | Rosenblatt .................... 713/159 |
| 2009/0054068 A1 | 2/2009 | Halkka et al. |
| 2009/0075593 A1 | 3/2009 | Demirbasa et al. |
| 2009/0112878 A1 | 4/2009 | Denny et al. |
| 2009/0284245 A1 | 11/2009 | Kirby et al. |
| 2010/0022217 A1* | 1/2010 | Ketari ........................... 455/411 |
| 2010/0180080 A1 | 7/2010 | Lin et al. |
| 2010/0203833 A1 | 8/2010 | Dorsey |
| 2010/0256831 A1 | 10/2010 | Abramo et al. |
| 2010/0330903 A1* | 12/2010 | Chabrerie ....................... 455/39 |
| 2011/0029605 A1 | 2/2011 | Barker |
| 2011/0047126 A1 | 2/2011 | Vargas et al. |
| 2011/0096726 A1* | 4/2011 | Schlack ......................... 370/328 |
| 2011/0099230 A1 | 4/2011 | Inapakolla et al. |
| 2011/0111696 A1* | 5/2011 | Lazaridis .................... 455/41.2 |
| 2013/0100944 A1* | 4/2013 | Kwon et al. ................... 370/338 |

* cited by examiner

US 8,832,850 B2

DEVICE, METHOD, AND SYSTEM FOR SECURE MOBILE DATA STORAGE

CROSS-REFERENCE TO RELATED U.S. PATENT APPLICATIONS

This application is a continuation application of U.S. application Ser. No. 13/404,904, entitled "DEVICE, METHOD, AND SYSTEM FOR SECURE MOBILE DATA STORAGE," which was filed on Feb. 24, 2012, the entirety of which is hereby incorporated by reference.

TECHNICAL FIELD

The present disclosure relates, generally, to mobile data storage devices and, more particularly, to mobile data storage devices for secure storage of data used by other mobile devices.

BACKGROUND

Mobile communication devices, such as smart phones, and other mobile computing devices are becoming ubiquitous companions for users. Such devices are used for various purposes including communicating with other people, storing entertainment media such as music, pictures, and video, storing and maintaining contact information, managing personal calendars and meetings, and the like. As such, typical mobile communication devices and other portable computing devices often store large amounts of data, some of which may be personal and confidential (e.g., banking information). Unfortunately, the loss of the mobile communication device can result in the permanent loss of the stored data as well as compromise of the security of the data. Although many mobile communication/computing device include some form of password protection, the typical protection scheme is relatively trivial that may be overcome by a "brute force" method (e.g., protection schemes having a four-digit password).

The management and protection of personal data is further complicated by the use of multiple mobile communication/computing device. That is, many people own and use multiple mobile communication/computing devices such as a smart phone, a laptop computer, a tablet computer, a mobile internet device, a personal digital assistant, and more stationary computing devices such as a desktop computer. Each of these communication/computing devices may have some personal data stored thereon, which may be unique to that particular device such that user's personal data is spread across the multiple devices. As such, there is no one device having all of the user's personal data requiring the user to access a particular communication/computing device to retrieve particular personal data.

SUMMARY

According to one aspect, a mobile data storage device may include a first communication circuit, a second communication circuit, a data storage and a processing circuit. The first communication circuit may establish a wireless control link with a mobile communication device using a short-range communication protocol. The second communication circuit may be different from the first communication circuit and may establish a wireless data link with the mobile communication device using a long-range communication protocol. The data storage may store data received from the mobile communication device. The processing circuit may be configured to determine whether the mobile communication device is within a reference security range of the mobile data storage device as a function of the wireless control link and perform at least one security function on the mobile data storage device in response to the mobile communication device being out of the reference security communication range.

In some embodiments, the short-range communication circuit has a bandwidth that is substantially lower than a bandwidth of the long-range communication circuit. Additionally, in some embodiments, the short-range communication circuit may be embodied as a Bluetooth® communication circuit and/or the long-rage communication circuit may be embodied as a Wi-Fi™ communication circuit.

Additionally, in some embodiments, the processing circuit may determine whether the mobile communication device is within a reference security communication range with the mobile data storage device by determining a received signal strength indicator (RSSI) measurement of the wireless control link. In such embodiments, the processing circuit may perform at least one security function in response to the RSSI measurement being less than a reference threshold value. Additionally or alternatively, the processing circuit may determine whether the mobile communication device is within the reference security communication range with the mobile data storage device by determining a distance between the mobile data storage device and the mobile communication device and perform at least one security function in response to the distance being greater than a reference distance. For example, in some embodiments, the mobile data storage device may include a Global Positioning System (GPS) circuit. In such embodiments, the processing circuit may determine the distance between the mobile data storage device and the mobile communication device by determining a current location of the mobile data storage device as a function of an output of the global positioning system (GPS) circuit.

In some embodiments, the mobile data storage device may further include an alarm. In such embodiments, the processing circuit may be configured to activate the alarm in response to the mobile communication device being out of the reference security communication range. The alarm may be embodied as, for example, an audible alarm, a visual alarm, and/or a tactile alarm. In some embodiments, the processing circuit may disconnect the wireless data link in response to the mobile communication device being out of the reference security communication range. Additionally, in some embodiments, the processing circuit may be configured to encrypt unencrypted data stored in the data storage in response to the mobile communication device being out of the reference security communication range.

Additionally, in some embodiments, the processing circuit may retrieve data from the data storage in response to receiving a data request from the mobile communication device and transmit the retrieved data to the mobile communication device over the wireless data link. For example, in some embodiments, the processing circuit may retrieve encrypted data from the data storage in response to receiving a data request from the mobile communication device, decrypt the encrypted data using a cryptographic key stored on the mobile data storage device, and transmit the decrypted data to the mobile communication device over the wireless data link.

In some embodiments, the processing circuit may be configured to receive data from the mobile communication device over the wireless data link and store the received data in the data storage. Additionally, in some embodiments, the processing circuit may encrypt the received data prior to storing the encrypted data. Further, in some embodiments, the processing circuit may transfer data over the wireless data link to the mobile communication device and communicate control signals over the wireless control link to the mobile communication device contemporaneously with the transfer to the data.

In some embodiments, the mobile data storage device may include a power source and a power management circuit coupled to the power source. In such embodiments, the power management circuit may be configured to determine a power level of the power source and adjust a power setting of the mobile data storage device as a function of the power level of the power source. For example, in some embodiments, the power management circuit may adjust an output power of the long-range communication circuit as a function of the power level of the power source. Additionally or alternatively, the power management circuit may be configured to transmit an alert to the mobile communication device over the wireless control link in response to the power level of the power source being less than a reference threshold level.

Additionally, in some embodiments, the processing circuit may be configured to determine a distance between the mobile data storage device and the mobile communication device. In such embodiments, the power management circuit may adjust an output power of the long-range communication circuit as a function of determined distance. Further, in some embodiments, the mobile data storage device may include a Global Positioning System (GPS) circuit to determine a current location of the mobile data storage device. In such embodiments, the processing circuit may adjust the reference security communication range as a function of the current location of the mobile data storage device. Additionally or alternatively, the power management circuit may adjust an output power of the long-range communication circuit as a function of the determined current location of the mobile data storage device. Further, in some embodiments, the processing circuit may detect the loss of the wireless data link and transmit an alert to the mobile communication device across the wireless control link in response to detecting the loss of the wireless data link.

According to another aspect, a method for secure mobile data storage may include establishing, on a mobile data storage device, a wireless control link with a mobile communication device using a short-range communication protocol, the wireless control link to communicate control signals with the mobile communication device. The method may also include establishing, on the mobile data storage device, a wireless data link with the mobile communication device using a long-range communication protocol, the wireless data link to transfer data with the mobile communication device. Additionally, the method may include determining whether the mobile communication device is within a reference security communication range with the mobile data storage device as a function of the wireless control link and performing at least one security function in response to the mobile communication device being out of the reference security communication range.

In some embodiments, establishing the wireless control link may include pairing the mobile data storage device with the mobile communication device. For example, pairing the mobile data storage device with the mobile communication device may include establishing a 1:1 pairing relationship between the mobile data storage device and the mobile communication device. Additionally, in some embodiments, establishing the wireless control link may include establishing a Bluetooth® communication link with the mobile communication device, and establishing the wireless data link may include establishing a Wi-Fi™ communication link with the mobile communication device.

Additionally, in some embodiments, determining whether the mobile communication device is within a reference security communication range with the mobile data storage device may include determining a received signal strength indicator (RSSI) measurement of the wireless control link and performing the at least one security function may include performing at least one security function in response to the RSSI measurement being less than a reference threshold value. Additionally or alternatively, determining whether the mobile communication device is within a reference security communication range with the mobile data storage device may include determining a distance between the mobile data storage device and the mobile communication device and performing the at least one security function may include performing at least one security function in response to the distance being greater than a reference distance. For example, determining a distance between the mobile data storage device and the mobile communication device may include determining a current location of the mobile data storage device using a global positioning system (GPS) circuit of the mobile data storage device.

In some embodiments, performing the at least one security function may include generating an alert in response to the mobile communication device being out of the reference security communication range. For example, the method may include generating at least one of an audible alert, a visual alert, and a tactile alert on the mobile data storage device. Additionally or alternatively, performing at least one security function may include disabling the wireless data link and/or encrypting unencrypted data stored on the mobile data storage device.

The method may further include receiving a data request from the mobile communication device, retrieving data from a data storage of the mobile data storage device as a function of the data request, and transmitting the data to the mobile communication device over the wireless data link. In such embodiments, retrieving data from a data storage of the mobile data storage device may include retrieving encrypted data, and the method may further include decrypting the encrypted data on the mobile data storage device using a cryptographic key stored on the mobile data storage device and transmitting the decrypted data to the mobile communication device over the wireless data link. In some embodiments, the method may further include receiving, on the mobile data storage device, data from the mobile communication device over the wireless data link and storing the data in a data storage of the mobile data storage device. For example, receiving data from the mobile communication device may include receiving un-encrypted data from the mobile communication device over the wireless data link. In such embodiments, the method may further include encrypting, on the mobile data storage device, the un-encrypted data received from the mobile communication device using a cryptographic key stored on the mobile data storage device and storing the encrypted data in a data storage of the mobile data storage device.

Additionally, in some embodiments, the method may further include transferring data over the wireless data link and communicating control signals over the wireless control link contemporaneously with the transfer to the data. Additionally or alternatively, the method may include determining a power level of a power source of the mobile data storage device and adjusting a power setting of the mobile data storage device based on the power level of the power source. For example, adjusting the power setting may include adjusting an output power of a long-range communication circuit of the mobile data storage device used to establish the wireless data link using the long-range communication protocol. Further, in some embodiments, the method may include transmitting an alert to the mobile communication device over the wireless control link in response to the power level of the power source being less than a reference threshold level.

The method may also include determining a distance between the mobile data storage device and the mobile communication device and adjusting an output power of a long-range communication circuit of the mobile communication device used to establish the wireless data link using the long-range communication protocol as a function of the determined distance. Additionally or alternatively, the method may further include determining a current location of the mobile data storage device using a global positioning system (GPS) circuit of the mobile data storage device. In such embodiments, the method may include adjusting the reference security communication range as a function of the current location of the mobile data storage device. Additionally or alternatively, the method may include adjusting an output power of a long-range communication circuit of the mobile communication device used to establish the wireless data link using the long-range communication protocol as a function of the determined current location of the mobile data storage device. The method may also include detecting the loss of the wireless data link between the mobile data storage device and the mobile communication device and transmitting an alert to the mobile communication device across the wireless control link in response to detecting the loss of the wireless data link.

Yet further, in some embodiments, the mobile communication device may be embodied as a first mobile communication device and the wireless data link may be embodied as a first wireless data link. In such embodiments, the method may further include establishing a second wireless data link between the first mobile communication device and a second mobile communication device. Additionally, the method may include retrieving data from a data storage on the mobile data storage device and transmitting the data from the mobile data storage device to the second mobile communication device over the first and second wireless data links.

Additionally, in some embodiments, the wireless data link may include a first wireless data link and the method may further comprise establishing a second wireless data link between the mobile communication device and data server over a network. In some embodiments, the method may further include transmitting data from the mobile data storage device to the data server over the first and second wireless data link. Additionally or alternatively, the method may include receiving, with the mobile data storage device, data from the data server over the first and second wireless data link.

According to yet a further aspect, a system for secure mobile data storage may include a mobile communication device and a mobile data storage device to communicate with the mobile data storage device. The mobile communication device may include a first short-range communication circuit and a first long-range communication circuit. The mobile data storage device may include a data storage, a second short-range communication circuit communicatively coupled to the first short-range communication circuit via a wireless control link using a short-range communication protocol, and a second long-range communication circuit communicatively coupled to the first long-range communication circuit via a wireless data link using a long-range communication protocol. The mobile communication device may be configured to transmit control signals to the mobile data storage device over the wireless control link using the first short-range communication circuit and transmit data over the wireless data link using the first long-range communication circuit. The mobile data storage device may be configured to receive the data over the wireless data link using the second short-range communication circuit and store the data in the data storage in response to receiving corresponding control signals over the wireless control link using the second long-range communication circuit.

In some embodiments, the wireless control link may be embodied as a Bluetooth® communication link and the wireless data link may be embodied as a Wi-Fi™ communication link. Additionally, the mobile communication device may be configured to determine whether the mobile data storage device is within a reference security range of the mobile communication device as a function of the wireless control link and perform at least one security function on the mobile communication device in response to the mobile communication device being out of the reference security communication range. For example, the mobile communication device may be configured to determine whether the mobile data storage device is within the reference security communication range with the mobile communication device by determining a received signal strength indicator (RSSI) measurement of the wireless control link. In such embodiments, the mobile communication device may perform at least one security function in response to the RSSI measurement being less than a reference threshold value. Additionally or alternatively, the mobile communication device may further include a global positioning system (GPS) circuit. In such embodiments, the mobile communication device may be configured to determine whether the mobile data storage device is within the reference security communication range with the mobile communication device by determining a distance between the mobile data storage device and the mobile communication device using the GPS circuit and perform at least one security function in response to the distance being greater than a reference distance value. For example, the mobile communication device may be configured to determine a current location of the mobile communication device and adjust the reference security communication range as a function of the current location.

Additionally, in some embodiments, the mobile communication device may be configured to determine whether the mobile data storage device is within a reference security range of the mobile communication device as a function of the wireless control link and generate an alert in response to the mobile data storage device being out of the reference security communication range. For example, the mobile communication device may generate an alert on the mobile communication device by generating at least one of an audible alert, a visual alert, and a tactile alert on the mobile data storage device. Additionally or alternatively, the mobile communication device may determine whether the mobile data storage device is within a reference security range of the mobile communication device as a function of the wireless control link and disconnect the wireless data link in response to the mobile data storage device being out of the reference security communication range.

Further, in some embodiments, the mobile communication device may include a data management module to receive a request for data from an application executed on the mobile communication device, send a control signal to the mobile data storage device over the wireless control link to request the data, and receive the requested data from the mobile data storage device over the wireless data link. Additionally or alternatively, the mobile communication device may be configured to encrypt the data prior to transmitting the data to the mobile data storage device over the wireless data link. Further, the mobile communication device may be configured to receive a signal from the mobile data storage device over the wireless control link indicative of a power level of a power source of the mobile data storage device and disable data retrieval from the mobile data storage device in response to the power level of the power source of the mobile data storage device being less than a reference power level.

Yet further, in some embodiments, the mobile communication device may be configured to receive a signal from the mobile data storage device over the wireless control link indicative of a power level of a power source of the mobile data storage device and transmit a control signal to the mobile data storage device over the wireless control link to adjust a power setting of the mobile data storage device in response to the power level of the power source of the mobile data storage device being less than a reference power level. For example, the power setting may include an output power of the long-range communication circuit of the mobile data storage device used to establish the wireless data link using the long-range communication protocol.

In some embodiments, the mobile communication device may be embodied as a first mobile communication device and the wireless data link may be embodied as a first wireless data link. In such embodiments, the system may further include a second mobile communication device having a third long-range communication circuit communicatively coupled with the first long-range communication circuit of the first mobile communication device via a second wireless data link. The first mobile communication device may be configured to transfer data from the mobile data storage device to the second mobile communication device using the first wireless data link and the second wireless data link. Additionally or alternatively, the first mobile communication device may be configured to receive a request for data from the second mobile communication device, transmit a control signal to the mobile data storage device over the wireless control link to request the data from the mobile data storage device, receive the requested data from the mobile data storage device over the first wireless data link, and transmit the requested data to the second mobile communication device over the second wireless data link.

Additionally, in some embodiments, the system may further include a remote data server. In such embodiments, the mobile communication device may be configured to copy data from the mobile data storage device to the remote data server. Additionally, the mobile communication device may include a backup module to retrieve data from the mobile data storage device and transmit the data to the remote data server for backup storage. For example, the backup module is configured to periodically retrieve the data from the mobile data storage device. Additionally or alternatively, the backup module may be configured to retrieve the data from the mobile data storage device in response to a selection of a command by a user of the mobile communication device. In some embodiments, the mobile communication device may be configured to retrieve data from the remote data server and transmit the data to the mobile data storage device for storage thereon. For example, the mobile communication device may be configured to retrieve the data from the remote data server in response to detecting that the mobile data storage device is a new mobile data storage device. Additionally or alternatively, the mobile communication device may be configured to retrieve the data from the remote data server in response to a selection of a command by a user of the mobile communication device.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
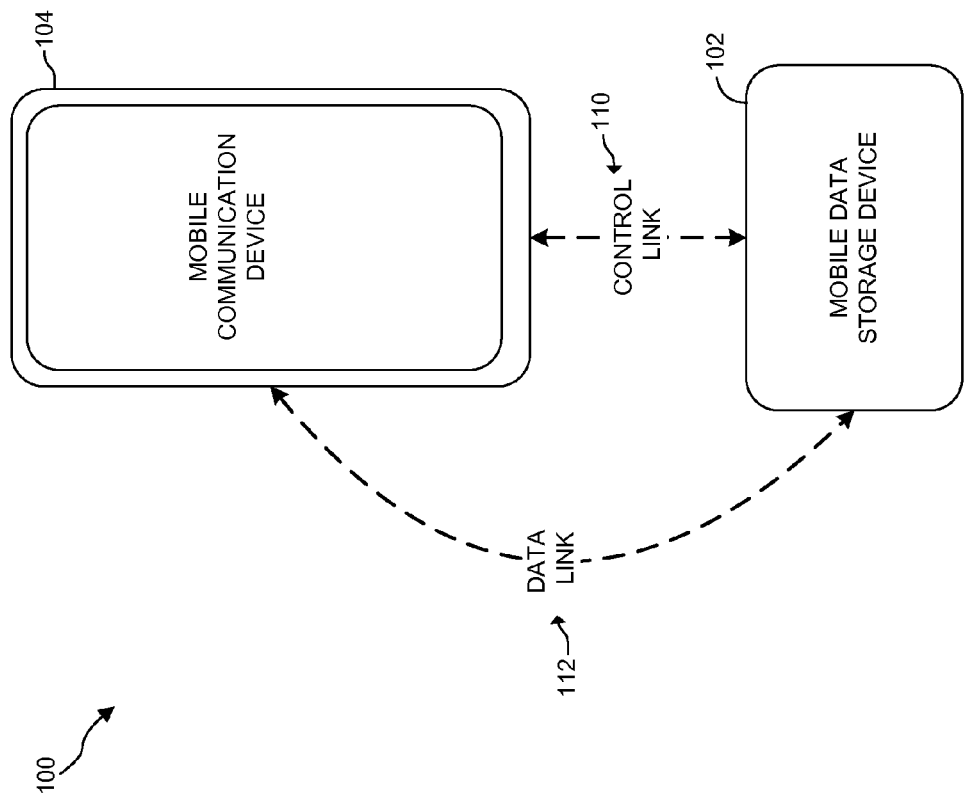
FIG. 1 is a simplified block diagram of one embodiment of a system for secure mobile data storage.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable medium, which may be read and executed by one or more processors. A machine-readable medium may be embodied as any device, mechanism or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages.

Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. Also, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Herein, alphanumeric characters and/or mathematical symbols, or a combination thereof, may be used to represent data values, variables, coefficients, functions, equations or portions thereof. It should be understood that once defined, a character or symbol may be repeated throughout the disclosure, and that, unless otherwise stated, such repeated instances of a character or symbol refer to the same character or symbol as initially defined.

Referring now to FIG. 1, a system 100 for secure mobile data storage includes a mobile data storage device 102 and a mobile communication device 104. As discussed in more detail below, in operation, the mobile data storage device 102 stores data used, or otherwise accessible, by various data-based applications executed on the mobile communication device 104. Such data storage on the mobile data storage device 102 may be in the form of a backup of data located on the mobile communication device 104 or may be embodied as "live" data that is actively accessed during the use of the various applications, programs, and/or functions of the mobile communication device 104. For example, the mobile data storage device 102 may store media data such as pictures, video, and music data; contact data such as e-mail and telephone number contact information; financial data such as banking information; preferences; security information; and any other data or information accessible on the mobile communication device 104 such as documents, presentations, spreadsheets, and/or the like. In some embodiments, as discussed below, such data may be stored in an encrypted state on the mobile data storage device 102.

The mobile data storage device 102 and the mobile communication device 104 communicate with each other over various communication links. For example, the mobile communication device 104 may transmit control signals to control the storage, access, and other functionality of the mobile data storage device 102 over a wireless control link 110, which is illustratively embodied as a short-range, low-bandwidth communication link such as a Bluetooth® communication link. Although the control signals are transferred using the wireless control link 110, all data transferred between the mobile data storage device 102 and the mobile communication device 104 is done so using a wireless data link 112, which is illustratively embodied as a long-range, relatively high-bandwidth communication link such as a Wi-Fi™ communication link. It should be appreciated that because the high-bandwidth wireless data link 112 is used to transfer data between the devices 102, 104, the bandwidth of the wireless control link 110 remains relatively low such that the transfer of the data between the devices 102, 104 can be performed in a quicker and more efficient manner. Of course, although the short-range communication link 110 is described herein as a Bluetooth® communication link and the long-range communication link 112 is described herein as a Wi-Fi™ communication link, other short-range and long-rang communication links and/or protocols may be used in other embodiments to establish separate control and data links between the devices 102, 104.

In addition to the data storage, the mobile data storage device 102 and/or the mobile communication device 104 may provide additional security functionality. For example, in some embodiments, the mobile data storage device 102 and/or the mobile communication device 104 may perform one or more security functions in response to the devices 102, 104 being separated from each other. Such security functions may include, for example, disabling the data link 112, encrypting unencrypted data, and generating various alarms.

Figure 2:
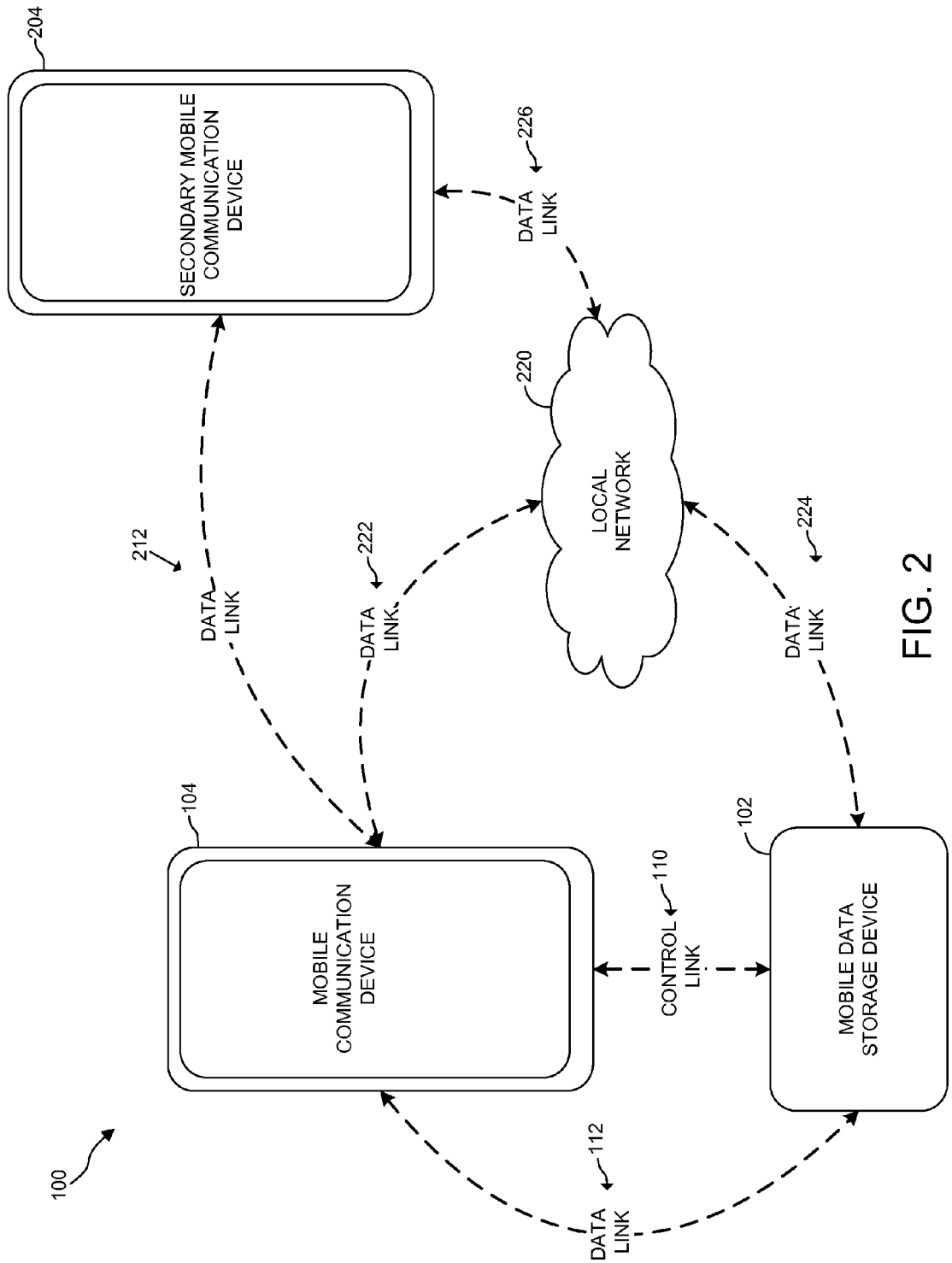
FIG. 2 is simplified block diagram of another embodiment of the system of FIG. 1.

Referring now to FIG. 2, in some embodiments, the mobile data storage device 102 may be configured to use additional or alternative data communication links to transfer data to and from the mobile communication device 104. For example, when a local network 220, such as a local area network (LAN), home network, Wi-Fi™ hotspot, or the like, is available, the mobile data storage device 102 and the mobile communication device 104 may transfer data between each other using the network 220 via wireless data links 222, 224, which may be embodied as long-range, relatively high-bandwidth communication links such as a Wi-Fi™ communication links. The mobile data storage device 102 may select to utilize the wireless data links 222, 224 instead of, or in addition to, the wireless data link 112 based on one or more criteria such as whether the local network 220 is available, the current data rate achieved over the wireless data link 112, and/or the like. Although the local network 220 and the corresponding wireless data links 222, 224 may be used for the transmission of data (instead of or in addition to the wireless data link 112), it should be appreciated that all control signals continue to be transmitted between the mobile data storage device 102 and the mobile communication device 104 using the wireless control link 110 as shown in FIG. 2.

Additionally, in some embodiments, the mobile communication device 104 may be configured to serve as an intermediary between the mobile data storage device 102 and a secondary mobile communication device 204. That is, data stored on the mobile data storage device 102 may be shared with additional mobile communication devices 204 in some embodiments. However, it should be appreciated that while facilitating such sharing of data, the mobile communication device 104 and the mobile data storage device 102 maintain a 1:1 pairing relationship. That is, the secondary mobile communication device 204 is unable to directly access any data storage on the mobile data storage device 102 as the mobile data storage device 102 is configured to communicate only with the paired mobile communication device 104 as discussed in more detail below. As such, the mobile communication device 104 may act as a "data server" in some embodiments to retrieve data from the mobile data storage device 102 and transmit (e.g., share) the data to the secondary mobile communication device 204 via a direct second wireless data link 212 or via the local network 220 and corresponding wireless data links 222, 226. Each of the wireless data links 212, 222, 226 may be embodied as a high-bandwidth communication links such as Wi-Fi™ communication links or other high-bandwidth communication links.

Of course, the mobile communication device 104 may also perform security functions to protect the data stored on the mobile data storage device 102 and, as such, may deny certain data requests received from the secondary mobile communication device 204. In this way, data stored on the mobile data storage device 102, such as pictures, video, and music media, may be shared with the secondary mobile communication device 204 in a secure manner.

Figure 3:
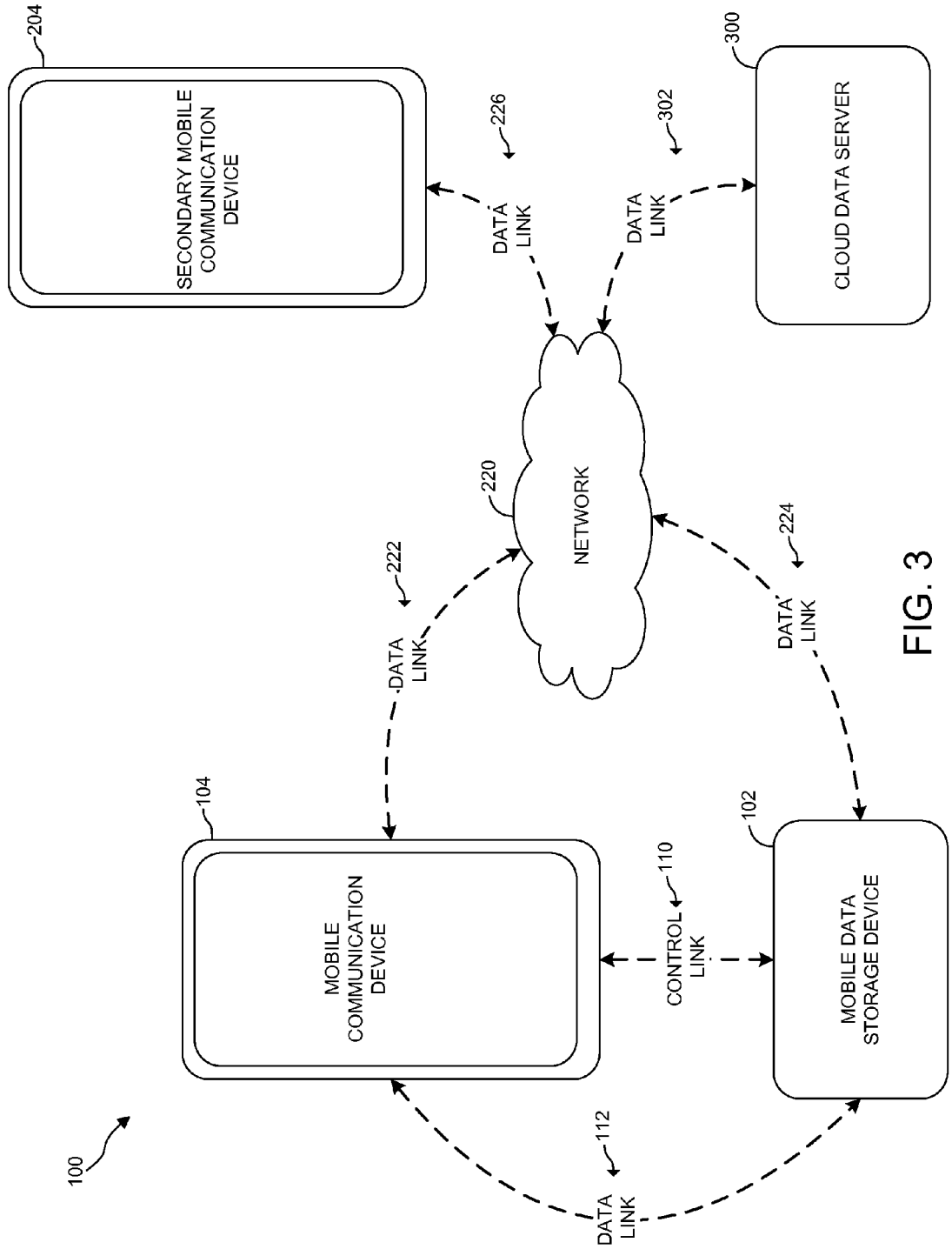
FIG. 3 is simplified block diagram of a further embodiment of the system of FIG. 1.

Referring now to FIG. 3, in some embodiments, the network 220 may be embodied as a non-local network. For example, the network 220 may be embodied as any number of various wired and/or wireless data and/or voice communication networks. For example, the network 220 may be embodied as or otherwise include a wide area network (WAN) or a publicly-accessible, global network such as the Internet. In such embodiments, the mobile data storage device 102 and the mobile communication device 104 may be configured to communicate data between each other over the network 220 using the wireless data links 222, 224 as discussed above. Additionally, in embodiments in which the mobile communication device 104 is configured to serve as an intermediary between the mobile data storage device 102 and the secondary mobile communication device 204, data stored on the mobile data storage device 102 may be shared with or otherwise accessed by the secondary mobile communication device 204 over the wide area/global network 220 via the data links 222, 226 as discussed above.

In the illustrative embodiment of FIG. 3, the system 100 also includes a remote cloud data server 300. The data server 300 may be used as a cloud-based backup for data stored on the mobile data storage device 102. To do so, the mobile communication device 104 may communicate with the cloud data server 300 over the network 220 via the data link 222 and a data link 302. The mobile data storage device 102 may periodically or responsively store the data on the cloud data server 300 via the mobile communication device 104. For example, in some embodiments, the mobile data storage device 102 may be configured to perform a backup of local data to the cloud data server 300 on a routine or periodic basis.

Additionally or alternatively, the mobile data storage device 102 may store or backup the local data in response to a user's selection of a backup command on the mobile communication device 104, in response to a change in the stored local data, in response to the creation or storage of particular type of data, in response to the amount of stored local data achieving a reference threshold, and/or in response to other criteria. Additionally, it should be appreciated that the mobile data storage device 102 may store or backup different types of local data to the cloud data server 300 according to different schedules. For example, particularly important data (e.g., banking information) or data used often (e.g., contacts) may be backed-up at a greater frequency than other data (e.g., media data such as music media).

The cloud data server 300 may also be used to repopulate a new mobile data storage device 102 with data. For example, should a user lose the mobile data storage device 102, the user may obtain a new mobile data storage device 102 and repopulate the new mobile data storage device 102 by accessing the data stored on the cloud data server 300. Of course, it should be appreciated that although the lost mobile data storage device 102 includes a full copy of the local data, such data is encrypted in the illustrative embodiments such that the security of the data is maintained even in the event the mobile data storage device 102 is lost.

Figure 4:
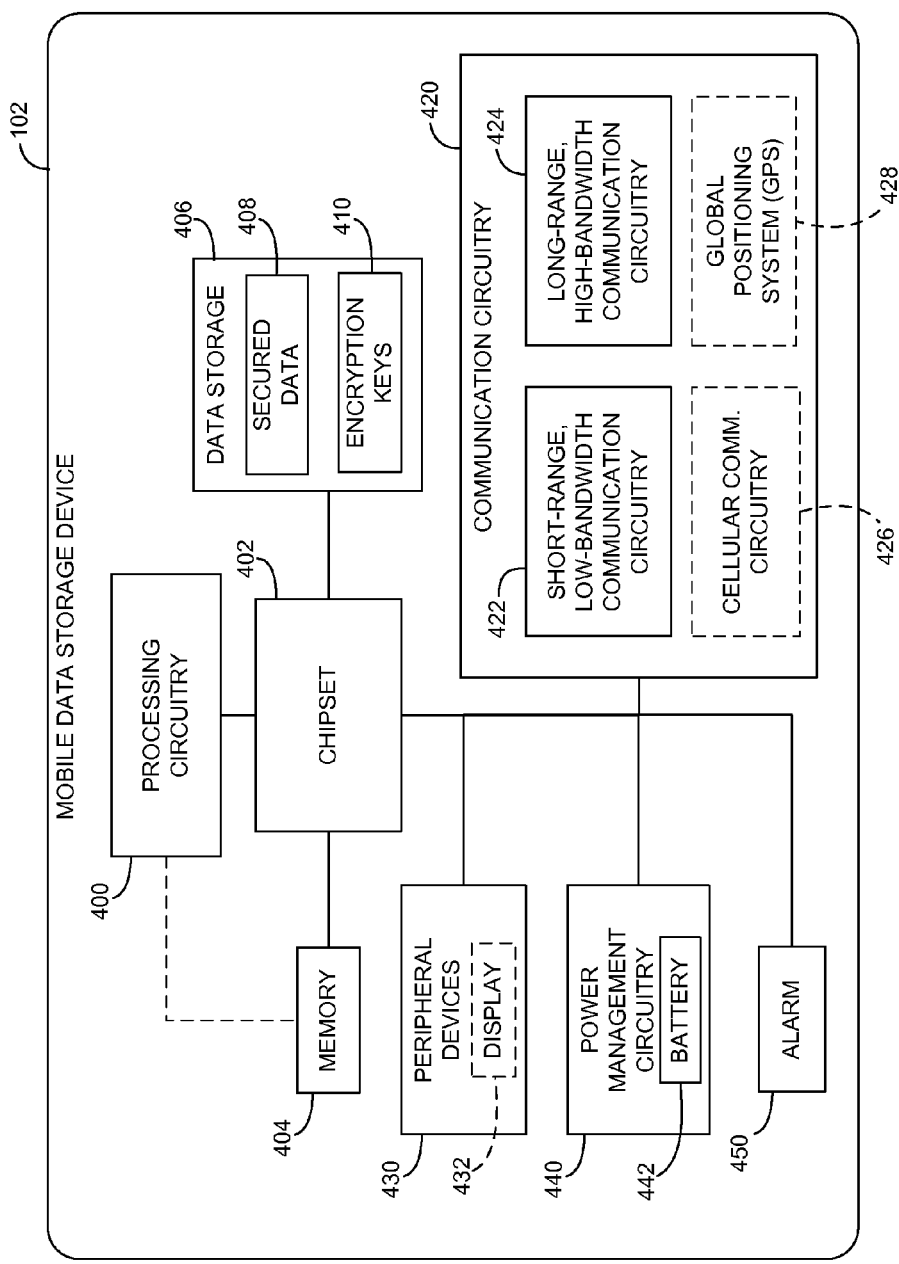
FIG. 4 is a simplified block diagram of one embodiment of a mobile data storage device of the systems of FIG. 1-3.

Referring now to FIG. 4, the mobile data storage device 102 may be embodied as any type of mobile data storage device capable of performing the functions described herein. In the illustrative embodiment, the mobile data storage device 102 is sized for carrying on a person, such as in a pocket of the clothing of the person. For example, the mobile data storage device 102 has a form factor substantially similar to a standard credit card in some embodiments. To ensure the physical security of the mobile data storage device 102, the mobile data storage device 102 may include no external data port in some embodiments. Further, in some embodiments, the mobile data storage device 102 may include no power ports either. In such embodiments, the mobile data storage device 102 may be charged via induction or thermoelectrically as discussed below. Additionally, it should be appreciated that the mobile data storage device 102 may include additional physical security features in some embodiments such as epoxy potting, active physical security circuits configured to destroy the circuits or data of the mobile data storage device 102 in response to sensing a physical intrusion, and/or other physical intrusion detection and security features.

In the illustrative embodiment of FIG. 4, the mobile data storage device 102 includes a processing circuitry 400, a chipset 402, a memory 404, a data storage 406, an alarm 412, communication circuitry 420, and one or more peripheral devices 430. In some embodiments, several of the foregoing components may be incorporated on a motherboard of the mobile data storage device 102, while other components may be communicatively coupled to the motherboard via, for example, a peripheral port. Furthermore, it should be appreciated that the mobile data storage device 102 may include other components, sub-components, and devices commonly found in a data storage device, which are not illustrated in FIG. 4 for clarity of the description.

The processing circuitry 400 of the mobile data storage device 102 may be embodied as any type of processing circuitry 400 capable of performing the functions described herein. For example, in some embodiments, the processing circuitry 400 may be embodied as or otherwise include a special-purpose microcontroller or digital signal processor. Alternatively, in other embodiments, the processing circuitry 400 may be embodied as or otherwise include a general-purpose processor capable of executing software/firmware. In such embodiments, the processing circuitry 400 may be embodied as a single core processor or a multi-core processor having multiple processor cores in other embodiments. Additionally, the processing circuitry 400 may include any number of processors, microcontrollers, digital signal processors, and/or other processing devices in other embodiments.

The chipset 402 of the mobile data storage device 102 may be embodied as circuitry and/or components to facilitate input/output operations with the processing circuitry 400 and/or other components of the mobile data storage device 102. In some embodiments, the chipset 402 may be embodied as a memory controller hub (MCH or "northbridge"), an input/output controller hub (ICH or "southbridge"), and a firmware device. However, in other embodiments, chipsets having other configurations may be used. For example, in some embodiments, the chipset 402 may be embodied as a platform controller hub (PCH). In such embodiments, the memory controller hub (MCH) may be incorporated in or otherwise associated with the processing circuitry 400, and the processing circuitry 400 may communicate directly with the memory 404 (as shown by the hashed line in FIG. 4). Additionally, in other embodiments, the chipset 402 may form a portion of a system-on-a-chip (SoC) and be incorporated, along with the processing circuitry 400 and other components of the mobile data storage device 102, on a single integrated circuit chip.

The processing circuitry 400 is communicatively coupled to the chipset 402 via a number of signal paths. These signal paths (and other signal paths illustrated in FIG. 4) may be embodied as any type of signal paths capable of facilitating communication between the components of the mobile data storage device 102. For example, the signal paths may be embodied as any number of wires, cables, light guides, printed circuit board traces, via, bus, intervening devices, and/or the like.

The memory 404 of the mobile data storage device 102 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 404 is communicatively coupled to the chipset 402 via a number of signal paths. Although only a single memory 704 is illustrated in FIG. 4, the mobile data storage device 102 may include additional memory devices in other embodiments. Various data and software may be stored in the memory 404. For example, in embodiments wherein the processing circuitry 400 is embodied as a processor, one or more operating systems, applications, programs, libraries, and/or drivers may be stored in the memory 404.

The data storage 406 may be embodied as any type of device or devices configured for the short-term or long-term storage of data such as, for example, memory devices and circuits, memory cards, hard disk drives, solid-state drives, or other data storage devices depending on, for example, the form factor of the mobile data storage device 102. As discussed above, the mobile data storage device 102 stores data used by the mobile communication device 104. In the illustrative embodiment, such data is stored on the mobile data storage device 102 in an encrypted state as secured data 408.

As such, the data storage 406 may also store cryptographic encryption keys 410 to encrypt and decrypt data received and transmitted to the mobile communication device 104. Such encryption keys 410 may be embodied as any suitable encryption keys for the secure storage and transfer of data between the devices 102, 104. For example, in one embodiment, the encryption keys 410 are embodied as Rivest-Shamir-Adleman (RSA) encryption keys, but other types of encryption algorithms and associated keys may be used in other embodiments.

The communication circuitry 420 of the mobile data storage device 102 may include any number of devices and circuitry for enabling communications between the mobile data storage device 102 and the mobile communication device 104. As discussed above, the mobile data storage device 102 and the mobile communication device 104 establish the wireless control link 110 to transmit control signals between the devices 102, 104 and the wireless data link 112 to transfer data between the devices 102, 104. As such, the mobile data storage device 102 includes a short-range, low-bandwidth communication circuit 422 and a long-range, high-bandwidth communication circuit 424. The short-range, low-bandwidth communication circuit 422 is used to establish the wireless control link 110 and may be embodied as any type of communication circuit capable of establishing a short-range, low-bandwidth communication link. In the illustrative embodiment, as discussed above, the short-range, low-bandwidth communication circuit 422 is embodied as a Bluetooth® communication circuit configured to establish a Bluetooth® communication link with the mobile communication device 104. For example, in one embodiment, the short-range, low-bandwidth communication circuit 422 has a maximum effective communication range of about 10 meters, but may have longer or shorter communication ranges in other embodiments.

The long-range, high-bandwidth communication circuit 424 is used to establish the wireless data link 112 and may be embodied as any type of communication circuit capable of establishing a long-range, high-bandwidth communication link. In the illustrative embodiment, as discussed above, the long-range, high-bandwidth communication circuit 424 is embodied as a Wi-Fi® communication circuit configured to establish a Wi-Fi® (i.e., the IEEE 802.11 standard) communication link with the mobile communication device 104. In the illustrative embodiment, the long-range, high-bandwidth communication circuit 424 has an effective communication range of greater than the short-range, low-bandwidth communication circuit 422 (e.g., 20 meters or more).

The communication circuitry 420 may include additional communication circuits in some embodiments. For example, in some embodiments, the mobile data storage device 102 may include a cellular communication circuitry 426 to allow the mobile data storage device 102 to communication with other devices (e.g., the mobile communication device 104) over a cellular connection. Additionally, in some embodiments, the communication circuitry 420 may include a global positioning system (GPS) circuit 428. In such embodiments, the GPS circuit 428 may generate data indicative of a current location of the mobile data storage device 102. The mobile data storage device 102, and/or the mobile communication device 104, may be configured to perform certain functions based on the current location of the mobile data storage device 102 as discussed in more detail below.

The peripheral devices 430 of the mobile data storage device 102 may include any number of additional input/output devices, interface devices, and/or other peripheral devices. For example, in one embodiment, the peripheral devices 430 may include a display 432 for displaying information to a user of the mobile data storage device 102 and, in some embodiments, receiving input from a user of the mobile data storage device 102 (e.g., the display 432 may be embodied as a touch screen display). In such embodiments, the peripheral devices 430 may include a corresponding graphics circuit to control the display 432. Additionally, in other embodiments, the mobile data storage device 102 may include other peripheral devices such as buttons, switches, speakers, and/or other input/output devices. The peripheral devices 430 are communicatively coupled to the chipset 402 via a number of signal paths thereby allowing the chipset 402 and/or processing circuitry 400 to receive inputs from and send outputs to the peripheral devices 430.

In some embodiments, the mobile data storage device 102 may include a power management circuitry 440 to monitor and manage a battery 442 or other power source of the mobile data storage device 102. For example, in some embodiments, the battery 442 may be embodied as a rechargeable battery or power source. In such embodiments, the power management circuitry 440 is configured to manage the recharging of the battery 442 (e.g., via inductive charging, thermoelectrically, or the like). Additionally, in some embodiments, the power management circuitry 440 is configured to monitor a power level of the battery 442 and perform various power management functions based on the power level of the battery 442. For example, in some embodiments, the power management circuitry 440 may disable particular features or circuits of the mobile data storage device 102 and/or generate an alarm in response to the power level of the battery 442 dropping below a reference threshold so as to maintain the core functionality of the mobile data storage device 102 until the battery 442 is recharged.

The mobile data storage device 102 may also include an alarm, which may be activated to alert a user of the mobile data storage device 102 to various conditions (e.g., that the power level of the battery 442 is below the reference threshold). The alarm may be embodied as any type of alarm including, for example, an audible alarm, a visual alarm (e.g., display 432), and/or a tactile alarm such as a vibration device.

Figure 5:
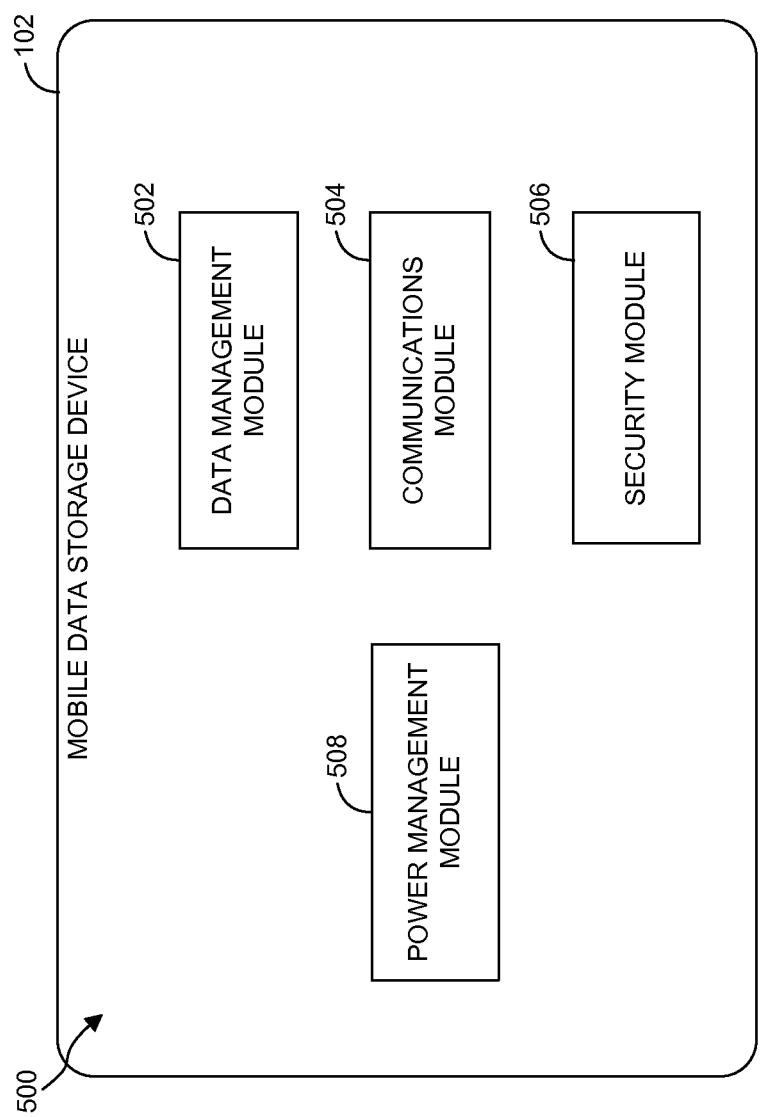
FIG. 5 is a simplified block diagram of one embodiment of a software environment of the mobile data storage device of FIG. 4.

Referring now to FIG. 5, in embodiments wherein the processing circuit 400 is embodied as a special purpose circuit, such as a microcontroller or digital signal processor, the mobile data storage device 102 may establish a software environment 500 during operation. The software environment 500 may include a data management module 502, a communication module 504, a security module 506, and/or a power management module 508. Each of the modules 502, 504, 506, 508 may be embodied as hardware, software, firmware, and/or a combination thereof. For example, it should be appreciated that in the illustrative embodiment of FIG. 5, the processing circuit 400 may not be configured for executing an independent operating system and associated applications. As such, in one particular embodiment, the modules 502, 504, 506, 508 form a portion of or are otherwise included in the processing circuit 400 or individual circuitry configured to perform the functions described below.

The data management module 502 manages the storage and retrieval of data stored on the mobile data storage device 102. For example, the data management module 502 may respond to requests for data received from the mobile communication device 104 by retrieving data from the data storage 406. Additionally or alternatively, the data management module 502 may receive data from the mobile communication device 104 and store the data in the data storage 406. In so doing, the data management module 502 may perform one or more cryptographic function on the data (e.g., the data management module 502 may encrypt data prior to storing the data in the data storage 406 and/or decrypt stored data prior to transmitting the data to the mobile communication device 104). Additionally, the data management module 502 may perform various back-up functions, such as periodically or responsive backing up data to the cloud data server 300 as discussed in more detail below.

The communications module 504 is configured to establish the wireless control link 110 and the wireless data link 112. Additionally, in some embodiments, the communications module 504 may monitor the links 110, 112 and respond to loss of one or more of the links 110, 112. For example, the communication module 504 may alert the security module 506 in the event that the wireless control link 110 is lost (e.g., the devices 102, 104 are separated).

The security module 506 is configured to monitor the operation of the mobile data storage device 102 and perform particular security functions in response to particular conditions of the mobile data storage device 102. For example, in the illustrative embodiment, the security module 506 is configured to determine whether the mobile data storage device 102 and the mobile communication device 104 are separated from each other by a distance greater than a reference security communication range (e.g., one of the devices 102, 104 has been lost). As discussed in more detail below, the security module 506 may monitor the proximity of the devices 102, 104 based on the wireless control link 110 (e.g., using a Received Signal Strength Indicator (RSSI) algorithm) or based on a determined location of the mobile data storage device 102 and/or the mobile communication device 104. In response to the devices 102, 104 becoming separated by a distance greater than the reference security communication range (e.g., 10 meters) or in response to other security conditions, the security module 506 may perform one or more security functions. Such security functions may include, for example, generating an alarm on the mobile data storage device 102 and/or the mobile communication device 104, disabling functions and/or circuits of the mobile data storage device (e.g., disabling the wireless data link 112), encrypting unencrypted data, and/or performing other security functions.

The power management module 508 monitors and manages the power source (e.g., battery 442) of the mobile data storage device 102. For example, the power management module 508 may facilitate the recharging of the battery 442. Additionally, the power management module 508 may adjust particular power settings of the mobile data storage device 102 based on a determined power level of the battery 442. For example, in some embodiments, the power management module 508 may disable particular features or circuits of the mobile data storage device 102 and/or generate an alarm in response to the power level of the battery 442 dropping below a reference threshold so as to maintain the core functionality of the mobile data storage device 102 until the battery 442 is recharged.

Figure 6:
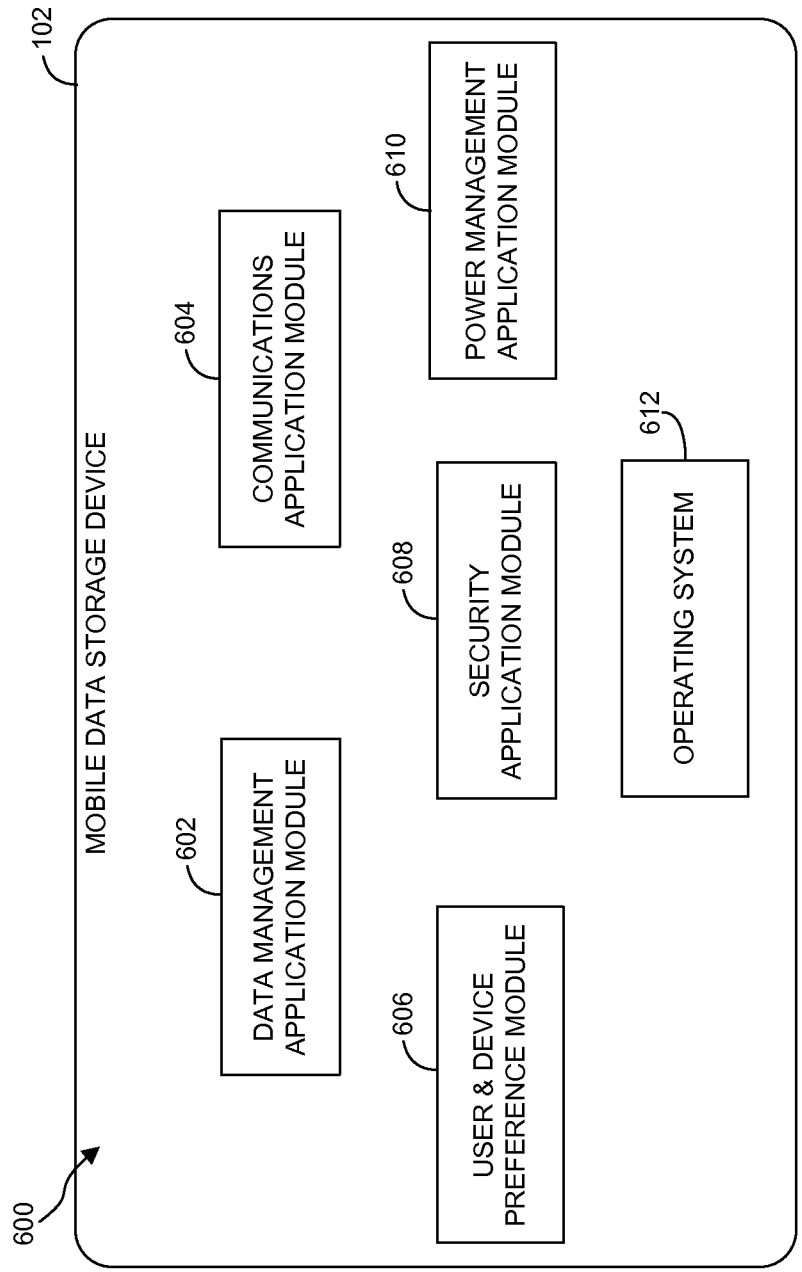
FIG. 6 is a simplified block diagram of another embodiment of a software environment of the mobile data storage device of FIG. 4.

Referring now to FIG. 6, in embodiments wherein the processing circuitry 400 is embodied as a general-purpose processor, the mobile data storage device 102 may establish a software environment 600. The software environment 600 illustratively includes a data management application module 602, a communications application module 604, a user and device preference module 606, a security application module 608, a power management application module 610, and an operating system 612. The data management application module 602, the communications application module 604, the security application module 608, and the power management application module 608 may be substantially similar to and perform similar functions as the data management application module 502, the communications application module 504, the security application module 506, and the power management application module 508 described above in regard to FIG. 4.

The user and device preference module 606 provides an interface for a user of the mobile data storage device to set, modify, and monitor user settings of the mobile data storage device 102. Such user settings may include, for example, a security range allowed between the mobile data storage device 102 and the mobile communication device 104, the periodicity of data backup procedures between the mobile data storage device 102 and the mobile communication device 104 and/or to the cloud data server 300, identification of which data, data types, and/or files to be stored and/or backed-up to the mobile data storage device 102, and/or other user and device preference settings. In some embodiments, the user and device preference module 606 may be configured to present a graphical user interface to the user of the mobile communication device 104 to facilitate modifications and management of the preference settings.

It should be appreciated that, in the embodiment of FIG. 6, each of the modules 502, 504, 506, 508, 510 may be embodied as or otherwise include software applications executed by the operating system 612. The operating system 612 may be embodied as any type of mobile device operating system capable of executing various software applications. Such applications may be stored on the mobile data storage device at the time of manufacturing or may be downloaded from a secure remote server during use (i.e., via use of the mobile communication device 104).

Figure 7:
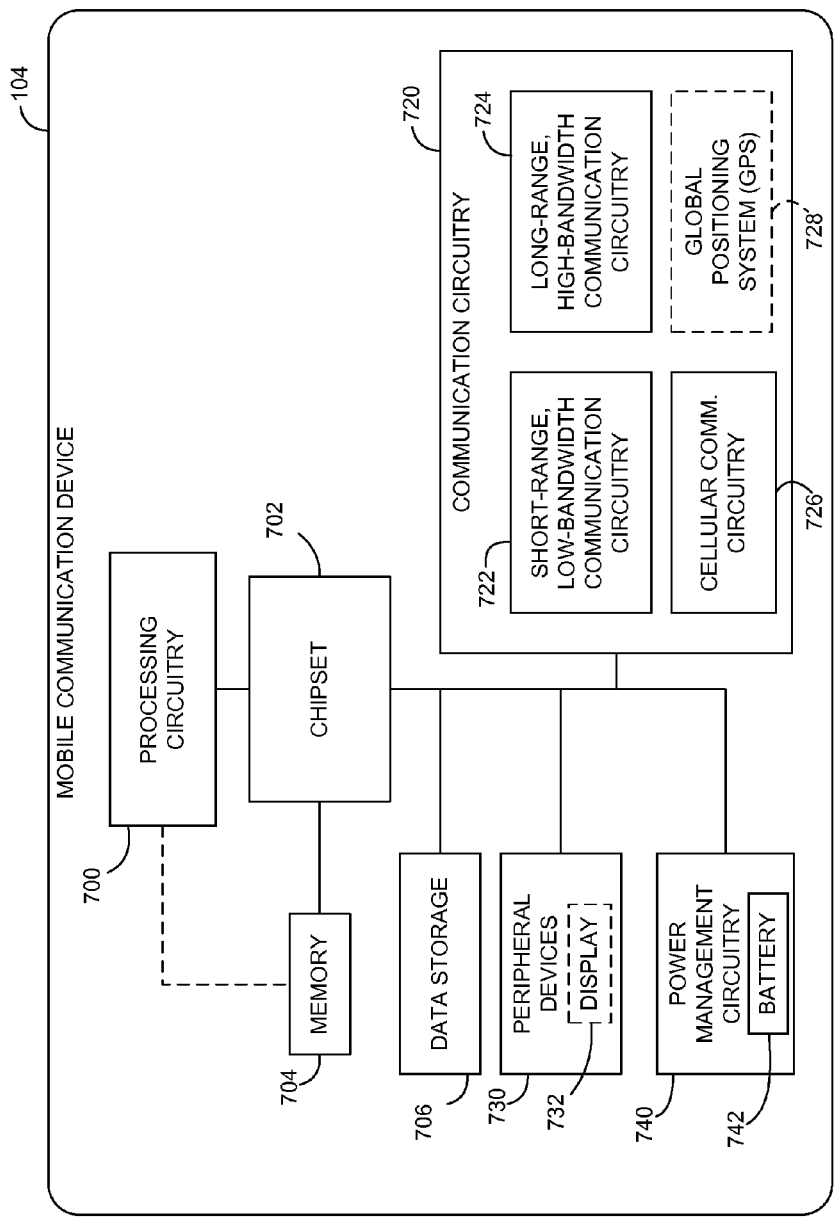
FIG. 7 is a simplified block diagram of one embodiment of a mobile communication device of the system of FIGS. 1-3.

Referring now to FIG. 7, the mobile communication device 104 may be embodied as any type of mobile communicating device such as a smart phone, a mobile internet device, a computing tablet, a laptop, a handheld computer, a personal digital assistant, a telephony device, or other mobile computing device. In the illustrative embodiment of FIG. 6, the mobile communication device 104 includes a processor 700, a chipset 702, a memory 704, a data storage 706, communication circuitry 720, and one or more peripheral devices 730. In some embodiments, several of the foregoing components may be incorporated on a motherboard of the mobile communication device 104, while other components may be communicatively coupled to the motherboard via, for example, a peripheral port. Furthermore, it should be appreciated that the mobile communication device 104 may include other components, sub-components, and devices commonly found in a computer and/or navigation system, which are not illustrated in FIG. 7 for clarity of the description.

The processor 700 of the mobile communication device 104 may be embodied as any type of processor capable of executing software/firmware, such as a microprocessor, digital signal processor, microcontroller, or the like. The processor 700 is illustratively embodied as a single core processor having a single processor core. However, in other embodiments, the processor 700 may be embodied as a multi-core processor having multiple processor cores. Additionally, the mobile communication device 104 may include additional processors 700 having one or more processor cores.

The chipset 702 of the mobile communication device 104 may be embodied as circuitry and/or components to facilitate input/output operations with the processor 700 and/or other components of the mobile communication device 104. In some embodiments, the chipset 702 may be embodied as a memory controller hub (MCH or "northbridge"), an input/output controller hub (ICH or "southbridge"), and a firmware device. However, in other embodiments, I/O subsystems having other configurations may be used. For example, in some embodiments, the chipset 702 may be embodied as a platform controller hub (PCH). In such embodiments, the memory controller hub (MCH) may be incorporated in or otherwise associated with the processor 700, and the processor 700 may communicate directly with the memory 704 (as shown by the hashed line in FIG. 7). Additionally, in other embodiments, the chipset 702 may form a portion of a system-on-a-chip (SoC) and be incorporated, along with the processor 700 and other components of the mobile communication device 104, on a single integrated circuit chip.

The processor 700 is communicatively coupled to the chipset 702 via a number of signal paths. These signal paths (and other signal paths illustrated in FIG. 7) may be embodied as any type of signal paths capable of facilitating communication between the components of the mobile communication device 104. For example, the signal paths may be embodied as any number of wires, cables, light guides, printed circuit board traces, via, bus, intervening devices, and/or the like.

The memory 704 of the mobile communication device 104 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 704 is communicatively coupled to the chipset 702 via a number of signal paths. Although only a single memory 704 is illustrated in FIG. 7, the mobile communication device 104 may include additional memory devices in other embodiments. Various data and software may be stored in the memory 704. For example, one or more operating systems, applications, programs, libraries, and drivers that make up the software stack executed by the processor 700 may reside in memory 704 during execution.

The data storage 706 may be embodied as any type of device or devices configured for the short-term or long-term storage of data such as, for example, memory devices and circuits, memory cards, hard disk drives, solid-state drives, or other data storage devices. The mobile communication device 104 may store various software applications and related data in the data storage 706. Additionally, in some embodiments, the data storage 706 may include cryptographic keys for performing various cryptographic functions on data transferred between the mobile communication device 104 and the mobile data storage device 102. As discussed above in regard to the mobile data storage device 102, such cryptographic keys 410 may be embodied as any suitable cryptographic keys, such as RSA cryptographic keys, for the secure storage and transfer of data between the devices 102, 104.

The communication circuitry 720 of the mobile communication device 104 may include any number of devices and circuitry for enabling communications between the mobile communication device 104 and the mobile data storage device 102. As discussed above, the devices 102, 104 establish the wireless control link 110 to transmit control signals between the devices 102, 104 and the wireless data link 112 to transfer data between the devices 102, 104. As such, the mobile communication device 104 includes a short-range, low-bandwidth communication circuit 722 and a long-range, high-bandwidth communication circuit 724. The short-range, low-bandwidth communication circuit 722 is used to establish the wireless control link 110 with the mobile data storage device and may be substantially similar to the short-range, low-bandwidth communication circuit 422 of the mobile data storage device 102. In the illustrative embodiment, the short-range, low-bandwidth communication circuit 722 is embodied as a Bluetooth® communication circuit configured to establish a Bluetooth® communication link with the mobile data storage device 102.

The long-range, high-bandwidth communication circuit 724 is used to establish the wireless data link 112 and may be substantially similar to the long-range, high-bandwidth communication circuit 424 of the mobile data storage device 102. In the illustrative embodiment, the long-range, high-bandwidth communication circuit 724 is embodied as a Wi-Fi® communication circuit configured to establish a Wi-Fi® (i.e., the IEEE 802.11 standard) communication link with the mobile data storage device 102.

The communication circuitry 720 may also include a cellular communication circuitry 726 to allow the mobile communication device 104 to communicate with other devices (e.g., the additional mobile communication device 204) over a cellular connection. Additionally, in some embodiments, the communication circuitry 720 may include a global positioning system (GPS) circuit 728, similar to the GPS circuit 428 described above in regard to the mobile data storage device 102. In such embodiments, the GPS circuit 728 may generate data indicative of a current location of the mobile communication device 104. The mobile communication device 104 may be configured to perform certain functions based on the current location of the mobile communication device 104 as discussed in more detail below.

The peripheral devices 730 of the mobile communication device 104 may include any number of additional input/output devices, interface devices, and/or other peripheral devices. For example, in one embodiment, the peripheral devices 730 may include a display 732, and corresponding graphics circuitry, for displaying information to a user of the mobile communication device 104. Of course, the peripheral devices 730 may include additional devices and structures for generating an output to a user of the device 104 and/or receiving an input or selection from the user. For example, in some embodiments, the peripheral devices 730 may include additional buttons, switches, speakers, and/or other input/output devices. The peripheral devices 730 are communicatively coupled to the chipset 402 via a number of signal paths thereby allowing the chipset 702 and/or processing circuitry 700 to receive inputs from and send outputs to the peripheral devices 730.

In some embodiments, the mobile communication device 104 may include a power management circuitry 740 to monitor and manage a battery 742 or other power source of the mobile communication device 104. For example, the power management circuitry 740 is configured to monitor a power level of the battery 742 and perform various power management functions based on the power level of the battery 742. In some embodiments, the power management circuitry 440 may disable particular features or circuits of the mobile communication device 104 and/or the mobile data storage device 102 in response to the power level of the battery 742 dropping below a reference threshold.

Figure 8:
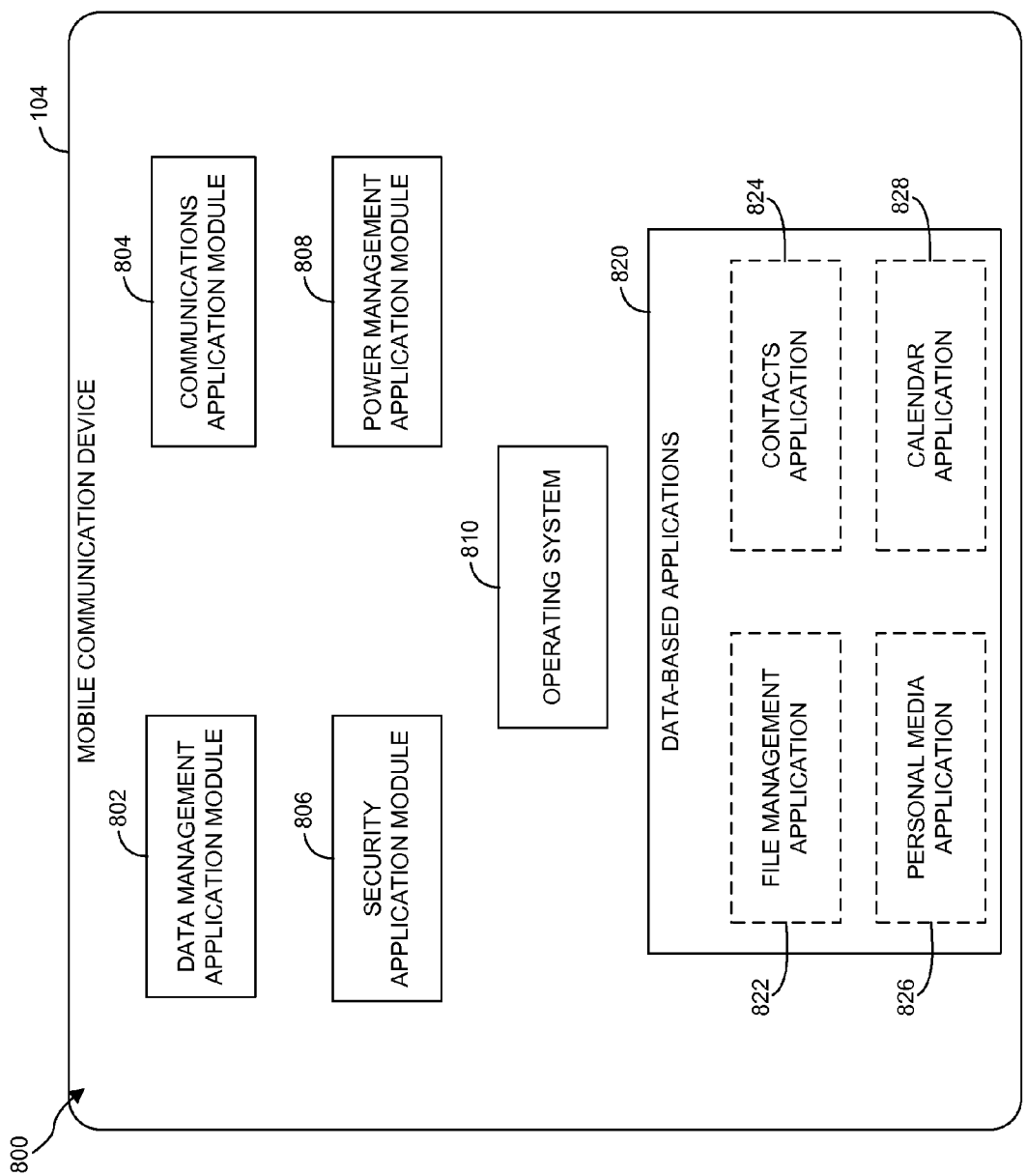
FIG. 8 is a simplified block diagram of one embodiment of a software environment of the mobile communication device of FIG. 7.
Figure 9:
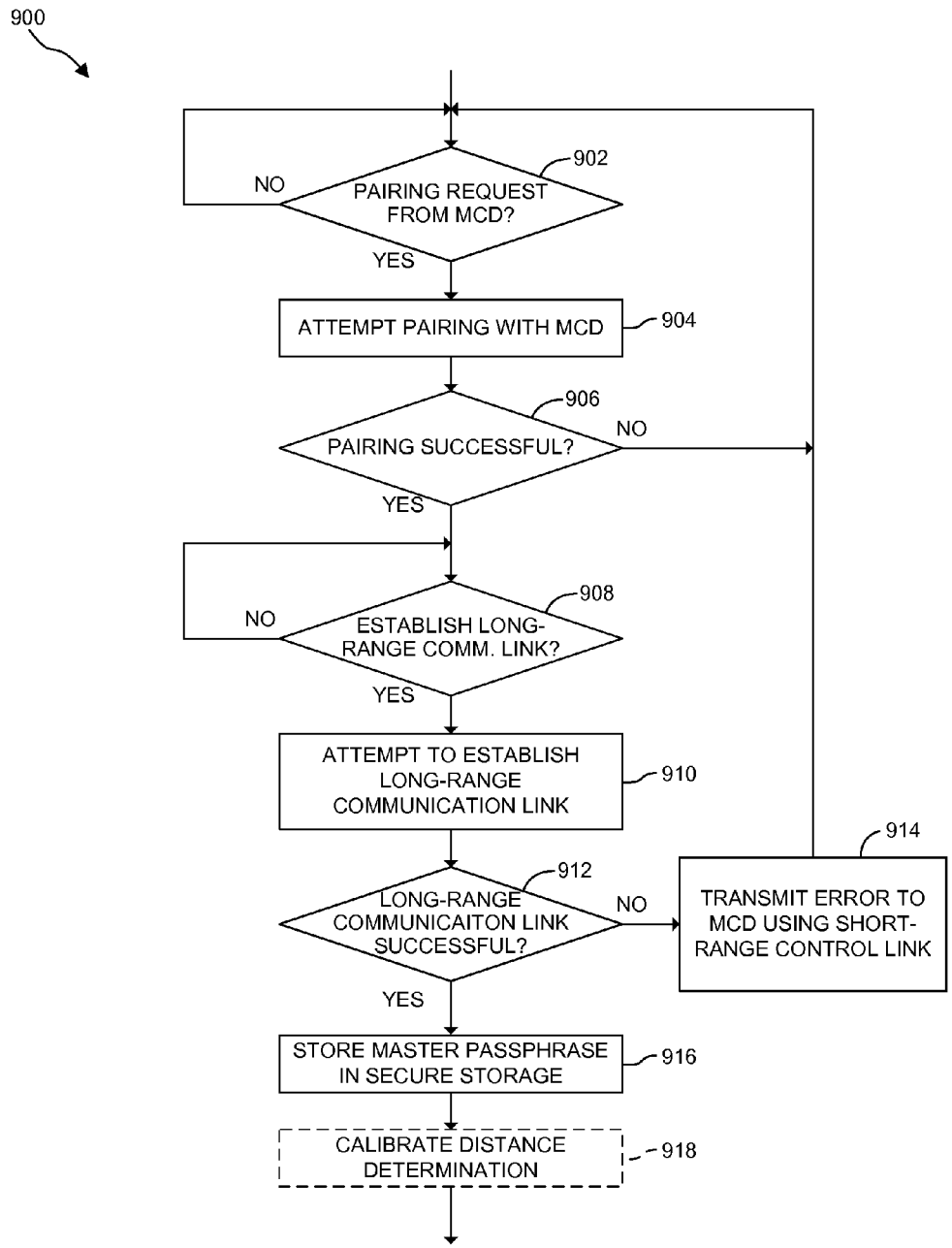
FIG. 9 is a simplified flow diagram of one embodiment of a method for establishing communication links with the mobile communication device of FIG. 7, which may be executed by the mobile data storage device of FIG. 4.

Referring now to FIG. 8, in use, the mobile communication device 104 may establish a software environment 800. The illustrative software environment includes a data management application module 802, a communication application module 804, a security application module 806, a power management application module 808, an operating system 810, and one or more data-based applications 820 that may be executed by the operating system 810 as discussed below. Each of the modules 802, 804, 806, and 808 may be embodied as hardware, software, firmware, and/or a combination thereof. For example, in some embodiments, the modules 802, 804, 806, and 808 may be embodied as software applications executed by the operating system 810 and associated circuitry. The operating system 810 may be embodied as any type of mobile device operating system capable of executing various software applications. Such applications may be stored on the mobile communication device 104 in, for example, the data storage 706.

The data application management module 802 manages the storage and retrieval of data stored on the mobile data storage device 102. For example, should the mobile communication device 104 require data from the mobile data storage device 102, the data management module 802 is configured to communicate a data request to the mobile data storage device 102 via the wireless control link 110. In response, the data management module 802 receives the requested data via the wireless data link 112 from the mobile data storage device 102. Similarly, should the mobile communication device 104 need to store data on the mobile data storage device 102, the data management module 802 may communication a data storage request to the mobile data storage device 102 via the wireless control link 110 and transmit the data to be stored to the mobile data storage device 102 via the wireless data link 112. As discussed above, the transfer of data from the mobile communication device 104 to the mobile data storage device 102 may be performed periodically (e.g., as a data backup request) or responsively. For example, in some embodiments, the data management module 802 is configured to respond to a request for data from one or more of the data-based applications 820 by communicating with the mobile data storage device 102 to retrieve and/or store data used by the data-based applications 820. In this way, the data management module 802 may act as an intermediary between the data-based applications 820 and the data stored on the mobile data storage device 102 such that the data used by the data-based applications 820 may be stored remotely from the mobile communication device 104, but used during runtime of the data-based applications 820 (e.g., the data management module 802 facilitates the data-based applications 820 to use the data stored on the mobile data storage device 102 as "live" data).

The communications application module 804 is configured to establish the wireless control link 110 and the wireless data link 112 with the mobile data storage device 102. Additionally, in some embodiments, the communications module 804 may monitor the links 110, 112 and respond to loss of one or more of the links 110, 112. For example, the communication module 804 may alert the security module 806 in the event that the wireless control link 110 is lost (e.g., the devices 102, 104 are separated).

The security application module 806 is configured to monitor the operation of the mobile data storage device 102 and perform particular security functions in response to particular conditions of the mobile data storage device 102. For example, in the illustrative embodiment, the security module 806 is configured to determine whether the mobile communication device 104 and the mobile data storage device 102 are separated from each other by a distance greater than a reference security communication range (e.g., one of the devices 102, 104 has been lost). To do so, as discussed in more detail below, the security module 806 may monitor the proximity of the devices 102, 104 based on the wireless control link 110 (e.g., using a Received Signal Strength Indicator (RSSI) algorithm) or based on a determined location of the mobile communication device 104 and/or the mobile data storage device 102 and/or the mobile communication device 104. In response to the devices 102, 104 becoming separated by a distance greater than the reference security communication range (e.g., 10 meters) or in response to other security conditions, the security module 806 may perform one or more security functions on the mobile communication device 104. Such security functions may include, for example, generating an alarm on the mobile communication device 104, transmitting alerts or instructions to the mobile data storage device 102, disabling functions and/or circuits of the mobile communication device 104 (e.g., disabling the wireless data link 112), encrypting unencrypted data, and/or performing other security functions.

The power management application module 808 monitors and manages the power source (e.g., battery 742) of the mobile communication device 104. For example, the power management module 508 may adjust particular power settings of the mobile communication device 104 based on a determined power level of the battery 742. In some embodiments, the power management module 808 may disable or adjust particular features or circuits of the mobile communication device 104, adjust particular power settings of the mobile data storage device 102, and/or generate an alarm in response to the power level of the battery 742 dropping below a reference threshold.

The data-based applications 820 may be embodied as any type of software application executed by the operating system 810 that accesses or uses data, which may be stored on the mobile data storage device 102. In the illustrative embodiment, the data-based applications 820 include a file management application 822, a contacts application 824 such as an e-mail application, a personal media application 826 such as a picture view or music player, and a calendar application 828. Of course, the data-based applications 820 may include additional or other applications in other embodiments. Each of the data-based applications 820 use, generate, or otherwise access data that may be stored locally on the mobile communication device 104 and subsequently backed-up to the mobile data storage device 102 or stored remotely on the mobile data storage device 102 and retrieved by the data management module 802 as needed by the data-based application 820. In either case, the data-based application 720 may function and operate as normal by interacting with such data as if the data was stored locally. As such, the data-based applications 820 may be substantially similar to typical data-based applications executed of typical mobile communication devices such as smart phones.

Referring now to FIG. 8, in operation, the mobile data storage device 102 may execute a method 900 for establishing communications with the mobile communication device 104. The method 900 begins with block 902 in which the mobile data storage device 102 determines whether a pairing request has been received from the mobile communication device 104. As discussed above, the mobile data storage device 102 and the mobile communication device 104 are paired with each other in a 1:1 relationship during use such that the mobile data storage device 102 is configured to communicate only with a single mobile communication device 104. Such pairing process is typically required only once during the initial set-up procedure of the mobile data storage device 102, but may be repeated upon loss of pairing (e.g., should the battery 442 of the mobile data storage device 102 lose power for an extended period of time).

If a pairing request is received from the mobile communication device 104, the method 900 advances to block 904 in which the mobile data storage device 102 attempts to pair with the mobile communication device 104 using the wireless control link 110. In the illustrative embodiment, the devices 102, 104 may utilize a Bluetooth® pairing procedure to establish the wireless control link 110. However, in other embodiments, the mobile data storage device 102 and the mobile communication device 104 may use any suitable pairing procedure to establish the wireless control link 110, which may include for example a handshake procedure between the devices 102, 104.

In block 906, the mobile data storage device 102 determines whether the pairing procedure was successful. If not, the method loops back to block 902 wherein the pairing procedure may be attempted again. However, if the pairing procedure was successful, the method 900 advances to block 908 wherein the mobile data storage device 102 determines whether to establish the long-range wireless data link 112. For example, in some embodiments, a user may instruct the mobile data storage device 102 to establish the wireless data link 112 using the mobile communication device 104 and the wireless control link 110. If so, the wireless data link 112 is established between the mobile data storage device 102 and the mobile communication device 104 in block 910. As discussed above, the wireless data link 112 may be embodied as any type of long-range, high-bandwidth data communication link. In the illustrative embodiment, the mobile data storage device 102 is configured to establish a Wi-Fi® communication data link with the mobile communication device 104 in block 910.

In block 912, the mobile data storage device 102 determines whether the wireless data link 112 has been successfully established. If not, the method 900 advances to block 914 in which the mobile data storage device 102 is configured to transmit an error or alert to the mobile communication device 104 to inform a user of the device 104 that an error has occurred with regard to the wireless data link.

If, however, the wireless data link 112 was successfully established, the method 900 advances to block 916 in which the master passphrase is passed from the mobile communication device 104 to the mobile data storage device 102. The mobile data storage device 102 subsequently securely stores the master passphrase in the data storage 308. After the master passphrase is stored in the mobile data storage device 102, the method 900 may advance to block 918 in which a distance determination procedure of the mobile data storage device 102 may be calibrated as discussed in more detail below with regard to FIG. 12.

Figure 10:
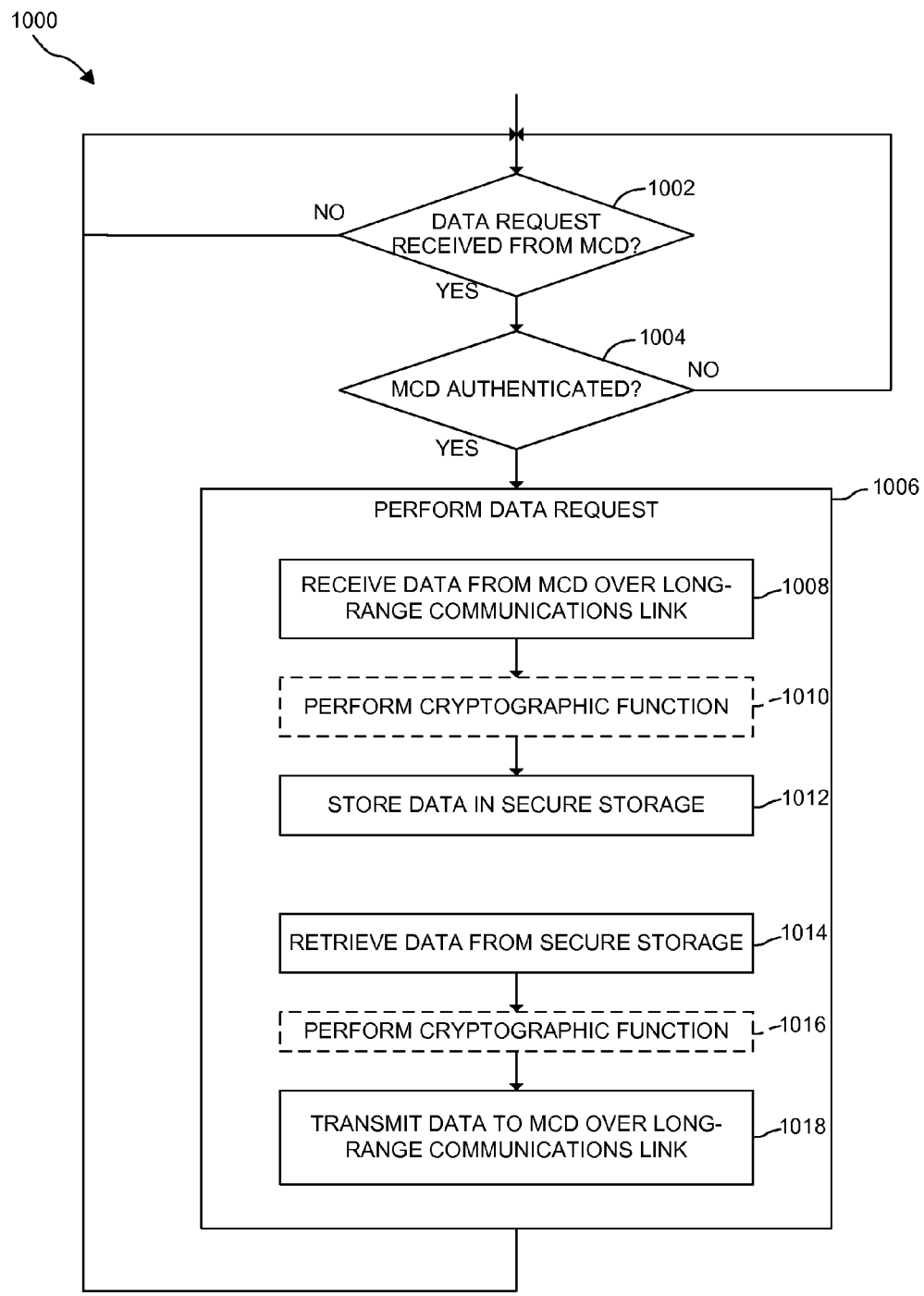
FIG. 10 is a simplified flow diagram of one embodiment of a method for responding to a data request received from the mobile communication device of FIG. 7, which may be executed by the mobile data storage device of FIG. 4.

Referring now to FIG. 10, the mobile data storage device 102 may also be configured to execute a method 1000 for responding to data requests received from the mobile communication device 104. The method 1000 begins with block 1002 in which the mobile data storage device 102 determines whether a data request has been received from the mobile communication device 104 via the wireless control link 110. If so, the method 1000 advances to block 1004 in which the mobile data storage device 102 authenticates the mobile communication device 104. To do so, the mobile data storage device 102 may utilize any suitable authentication procedure to verify the identity of the mobile communication device 104. In some embodiments, such authentication is performed as a function of the pairing of the devices 102, 104. Additionally or alternatively, in some embodiments, the mobile communication device 104 may transmit a cryptographically signed certificate to the mobile data storage device 102 such that the device 102 may authenticate the mobile communication device 104.

If the mobile communication device 104 is successfully authenticated in block 1004, the method 1000 advances to block 1006 in which the mobile data storage device 102 performs the data request. For example, in block 1008, the mobile data storage device 102 may receive data from the mobile communication device 104 over the wireless data link 112. In some embodiments, the mobile data storage device 102 may be configured to perform various cryptographic functions on the received data in block 1010. For example, the mobile data storage device 102 may be configured to encrypt data received in an unencrypted format, decrypt data received in an encrypted format, and/or perform other cryptographic functions on the received data. In block 1012, the mobile data storage device 102 may store the received data (in an encrypted or unencrypted form) in the data storage 406.

Alternatively, the mobile data storage device 102 may receive a request for data from the mobile communication device 104. If so, the mobile data storage device 102 may retrieve the requested data from the secure data storage 406 in block 1014. In block 1016, the mobile data storage device 102 may perform one or more cryptographic functions on the retrieved data. For example, in some embodiments, the mobile data storage device 102 may encrypt or decrypt the retrieved data in block 1016. The mobile communication device 104 subsequently transmits the retrieved data to the mobile communication device 104 over the wireless data link 112 in block 1018.

Figure 11:
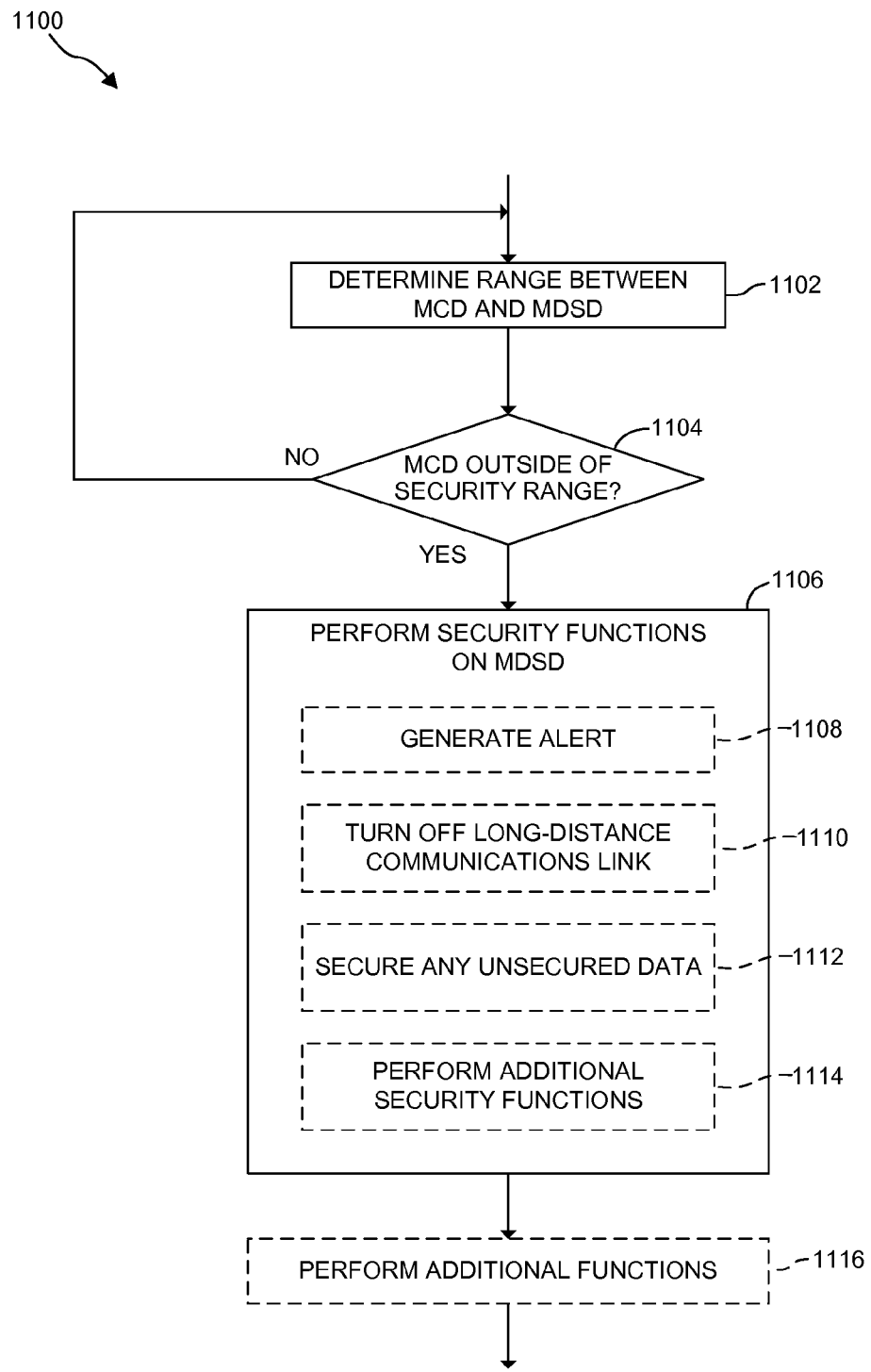
FIG. 11 is a simplified flow diagram of one embodiment of a method for managing security functions that may be executed by the mobile data storage device of FIG. 4.

Referring now to FIG. 11, in some embodiments, the mobile data storage device 102 may also execute a method 1100 for managing security functions of the mobile data storage device 102 and/or the mobile communication device 104. In particular, the mobile data storage device 102 may be configured to determine whether the mobile data storage device 102 and the mobile communication device 104 are separated from each other by a distance greater than an established security communication range. To do so, the mobile data storage device 102 may determine a range or distance between the mobile data storage device 102 and the mobile communication device 104 in block 1002. The range or distance determined in block 1102 may be embodied as a distance value (e.g., in meters) or may be embodied as a value indicative of such distance. For example, in some embodiments, the mobile data storage device 102 is configured to determine whether the mobile communication device 104 is within the reference security range relative to the mobile data storage device 102 based on a received signal strength indicator (RSSI) measurement of the wireless control link 110. Alternatively, the mobile data storage device 102 may determine a current location of the device 102 using, for example, the global positioning system (GPS) circuit 428 and a current location of the mobile communication device 104 (e.g., the mobile data storage device 102 may receive data indicative of the location of the mobile communication device 104 over the wireless data link 112) and determine a distance between the devices 102, 104 based on such current locations. Further still, the mobile data storage device 102 may use other methodologies, such as cellular triangulation or wireless access point location determination, to determine the relative distance between the devices 102, 104.

If the mobile data storage device 102 determines that the mobile communication device 104 is outside the reference security communication range in block 1104, the method 1100 advances to block 1106 in which the mobile data storage device 102 may perform one or more security functions. For example, in block 1108, the mobile data storage device 102 may generate a local alarm, which may be embodied as an audible alarm, a visual alarm (e.g., in embodiments in which the mobile data storage device 102 includes the display 432), and/or a tactile alarm. Additionally or alternatively, the mobile data storage device 102 may turn off or otherwise disable the wireless data link 112 in block 1110 and secure any unsecured data (e.g., encrypt any unencrypted data) in block 1112. Additionally, the mobile data storage device 102 may perform additional or other security functions in block 1114. For example, in some embodiments in which the wireless control link 110 is still active, the mobile data storage device 102 may be configured to transmit an alert to the mobile communication device 104 over the wireless control link 110 to indicate that a security violation has occurred. Further, in some embodiments, the mobile data storage device 102 may be configured to perform additional functions, which may be unrelated or not directly related to security functions, in block 1116. For example, the mobile data storage device 102 may attempt to reestablish the wireless control link 110 or perform other functions in response to determining that the mobile communication device 104 is outside the reference security communication range.

Figure 12:
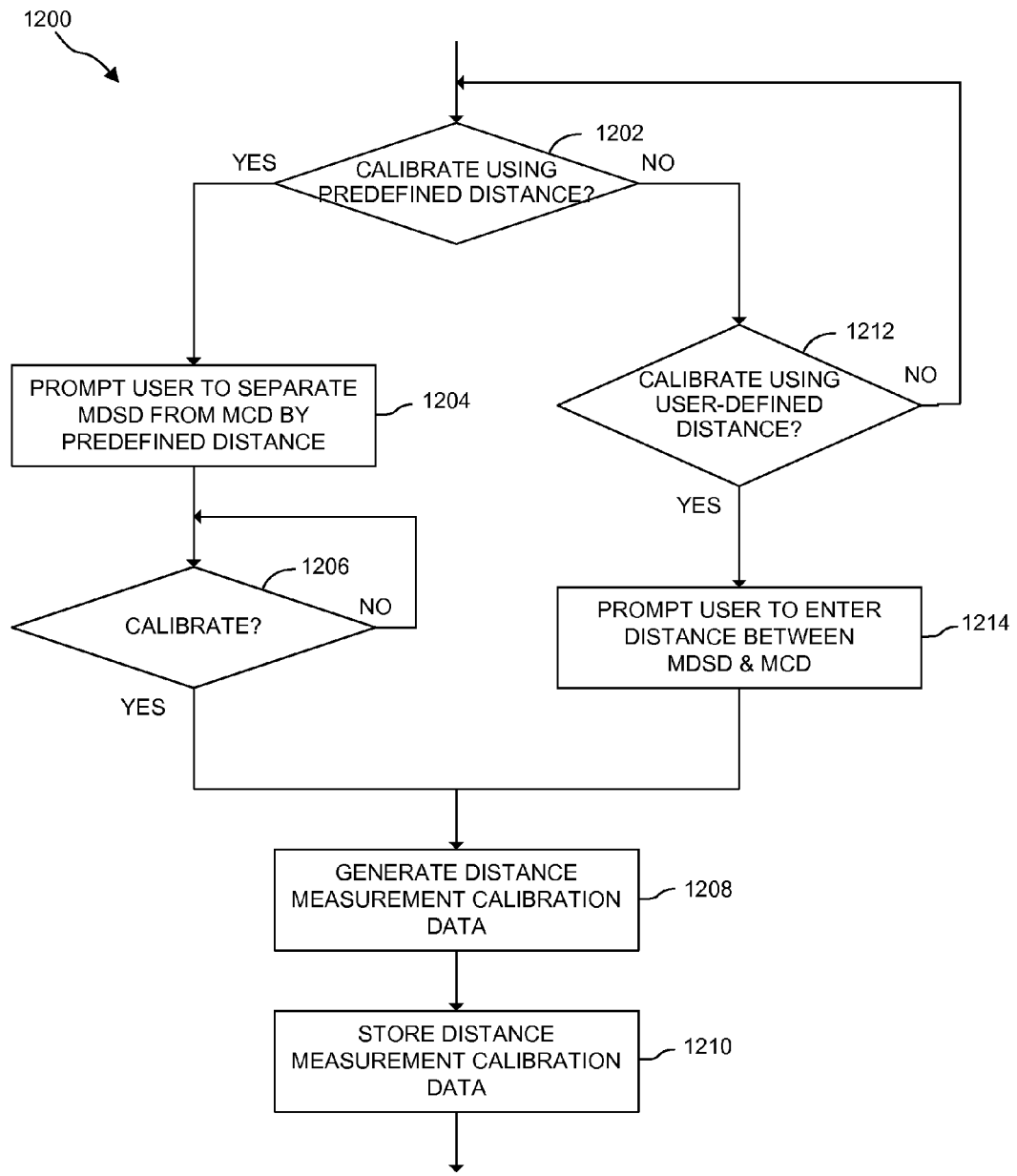
FIG. 12 is a simplified flow diagram of one embodiment of a method for calibrating the distance measurement features of the mobile data storage device of FIG. 4.

Referring now to FIG. 12, as discussed above with regard to the method 1200 of FIG. 1200, the distance determination functionality of the mobile data storage device 102 may be calibrated in some embodiments. That is, the accuracy of the determination of the distance between the mobile data storage device 102 and the mobile communication device 104 may be calibrated or otherwise adjusted such that mobile data storage device 102 may more accurately determine whether the mobile communication device 104 is outside the security communication range. The method 1200 begins with block 1202 in which the mobile data storage device 102 determines whether to calibrate using a predefined distance. For example, the user may select to calibrate using a predefined distance from a menu displayed on the mobile communication device 104. Alternatively, the mobile data storage device 102 may be configured to calibrate using the predefined distance at all times or as a default option. Regardless, if calibration using a predefined distance is to be used, the method 1200 advances to block 1204 in which the user is prompted (e.g., via the display 732 of the mobile communications device 104) to separate the mobile data storage device 102 and the mobile communication device 104 by a fixed distance (e.g., three feet). The specific fixed distance used may be preset or selected from a menu by the user. Additionally, any one of a number of fixed distances may be used that is within a minimum and maximum separation distance. For example, in some embodiments, a fixed distance of one to ten feet may be used. Of course, in other embodiments, other fixed distances may be used.

In block 1206, the mobile data storage device 102 determines whether to perform the requested calibration. For example, after the user has separated the mobile data storage device 102 and the mobile communication device 104 by the fixed distance, the user may select a button or option on the mobile communication device 104 to inform the mobile data storage device 102 that the devices 102, 104 have been separated by the fixed distance and instruct the mobile data storage device 102 to perform the calibration. If so, the method 1200 advances to block 1208 in which the mobile data storage device 102 generates distance measurement calibration data, which is stored in the mobile data storage device 102 in block 1210. The distance measurement calibration data may be subsequently used as an offset or adjustment to any determined distance between the mobile data storage device 102 and the mobile communication device 104.

Referring back to block 1202, if calibration using a predefined distance is not selected or otherwise used, the method 1200 advances to block 1212. In block 1212, the mobile data storage device 102 determines whether to calibrate using a user-defined distance. If not, the method 1200 loops back to block 1202. However, if a user-defined distance is to be used, the method 1200 advances to block 1214. In block 1214, the user is prompted (e.g., via the display 732 of the mobile communications device 104) to separate the mobile data storage device 102 and the mobile communication device 104 by some user-defined distance and subsequently enter the separation distance into the mobile communication device 104. After the user enters the distance of separation, the method 1200 advances to blocks 1208, 1210 in which the distance measurement calibration data is generated and stored using the user-defined distance. It should be appreciated that although the method 1200 is described above as being performed on the mobile data storage device 102, the method 1200 (or portions thereof) may be performed on the mobile communication device 104.

Figure 13:
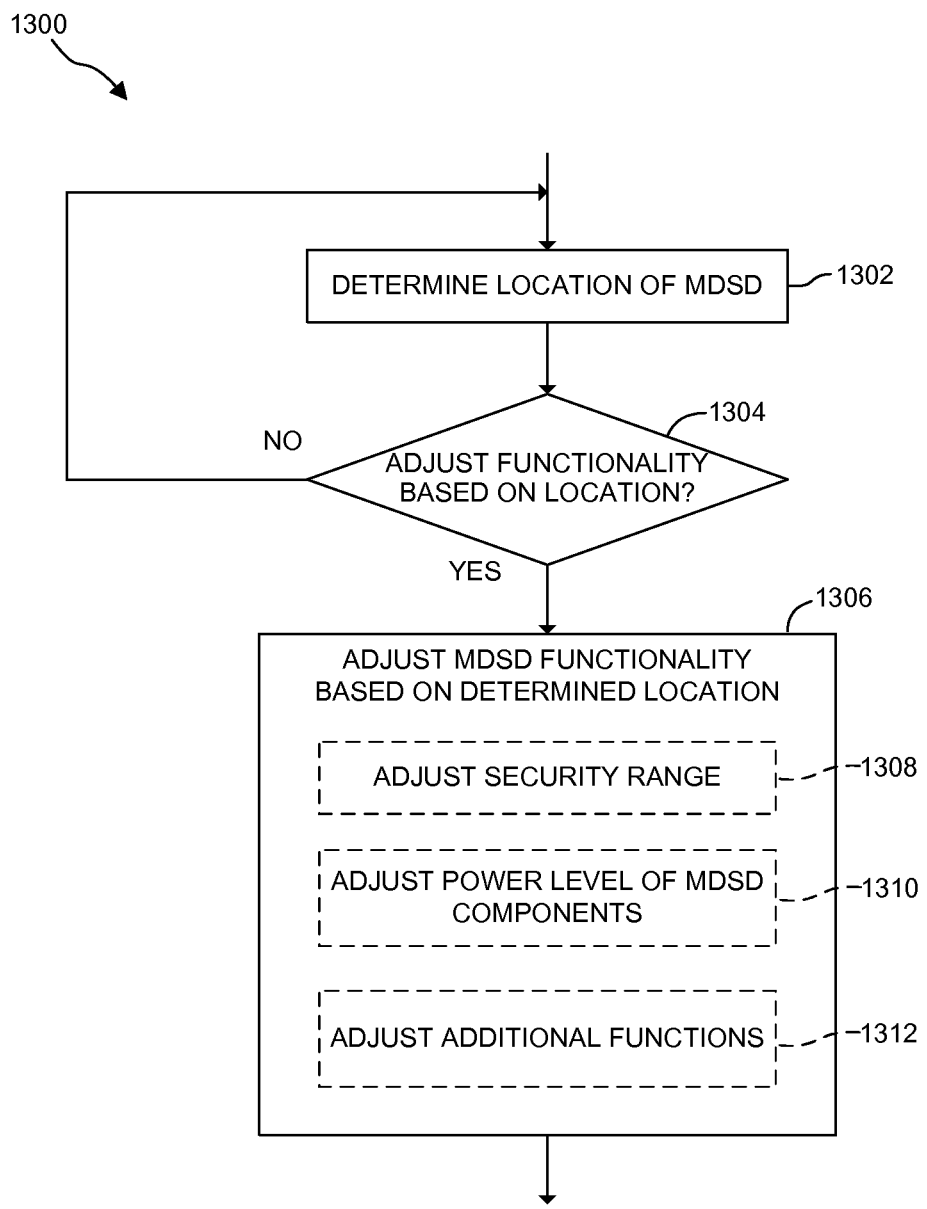
FIG. 13 is a simplified flow diagram of one embodiment of a method for managing location-based functionality that may be executed by the mobile data storage device of FIG. 4.

Referring now to FIG. 13, in some embodiments, the mobile data storage device 102 may also execute a method 1300 for managing location-based functionality of the mobile data storage device 102. If so, the method 1300 begins with block 1302 in which the mobile data storage device 102 determines a current location of the device 102. As discussed above, the mobile data storage device 102 may use any suitable methodology to determine the current location. For example, in some embodiments, the mobile data storage device 102 may include the global positioning system (GPS) circuitry 328, which may generate data indicative of the current location of the device 102. Additionally or alternatively, the mobile data storage device 102 may utilize the cellular communication circuitry 426 to determine a current location of the device 102 based on a cellular triangulation process. Yet further, in other embodiments, the mobile data storage device 102 may determine the current location based on a wireless access point location determination methodology or other methodology and/or devices.

In block 1304, the mobile data storage device 102 determines whether to adjust functionality of the mobile data storage device 102. For example, if the mobile data storage device 102 determines that the device 102 is at the home of the user of the device 102, the mobile data storage device may adjust particular functions of the device 104 relative to other locations, such as the work location of the user. To do so, in block 1306, the mobile data storage device 102 adjusts the functionality based on the determined location. For example, in block 1308, the mobile data storage device 102 may adjust the reference security range. In this way, the reference security range may be increased in trusted locations (e.g., the user's home) and decreased in untrusted locations (e.g., in public places). Additionally, in some embodiments, the mobile data storage device 102 may adjust the power of various components of the device 102 in block 1310. For example, in one particular embodiment, the mobile data storage device may adjust the power level of the long-range communication circuitry 324. For example, in trusted locations, the mobile data storage device 102 may increase the power, and thereby communication range, of the long-range communication circuitry 324. Additionally, in some embodiments, additional functions of the mobile data storage device 102 may be adjusted based on the determined location. For example, the functions to be adjusted may be based on the user preference settings as controlled by the user and device preference module 606.

Figure 14:
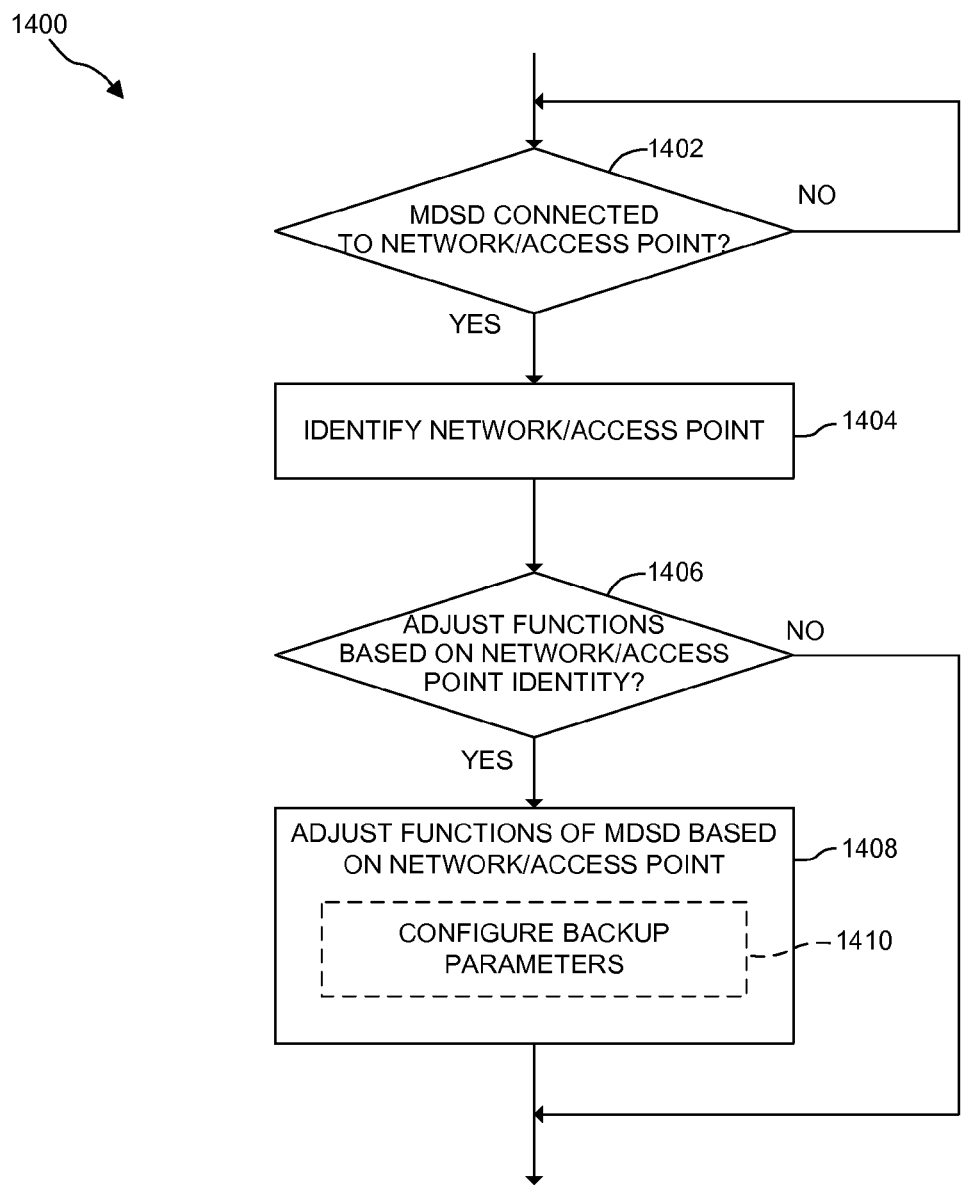
FIG. 14 is a simplified flow diagram of one embodiment of a method for adjusting features of the mobile data storage device of FIG. 4.

Referring now to FIG. 14, in some embodiments, the mobile data storage device 102 may be configured to adjust functionality of the mobile data storage device 102 based on the network or access point to which the mobile data storage device 102 is connected. For example, certain functions may be enabled when the mobile data storage device 102 is connected to a known or trusted network (e.g., the user's home network) and/or disabled when connected to an unknown network. The method 1400 begins with block 1402 in which the mobile data storage device 102 determines whether the device 102 is connected to a network or access point. If so, the method 1400 advances to block 1404 in which the mobile data storage device 102 determines the identity of the network and/or access point. To do so, the mobile data storage device may use any suitable methodology including, for example, a look-up table, external network sources, user input, and/or an inference engine.

In block 1406, the mobile data storage device 102 determines whether to adjust functions based on the identified network or access point. Such determination may be based on, for example, the user and device preference data controlled by the user and device preference module 606. If not, the method 1400 exits. However, if the functions of the mobile data storage device 102 are to be adjusted based on the identified network/access point, the method 1400 advances to block 1408. In block 1408, the mobile data storage device 102 adjusts particular functions of the device 102 based on the identified network and/or access point. Again, the particular functions to be adjusted and the nature of such adjustments may be dictated by, or in part by, the user and device preferences. For example, in some embodiments, the backup parameters (e.g., the frequency of backups) is configured in block 1410 based on the identified network and/or access point.

Figure 15:
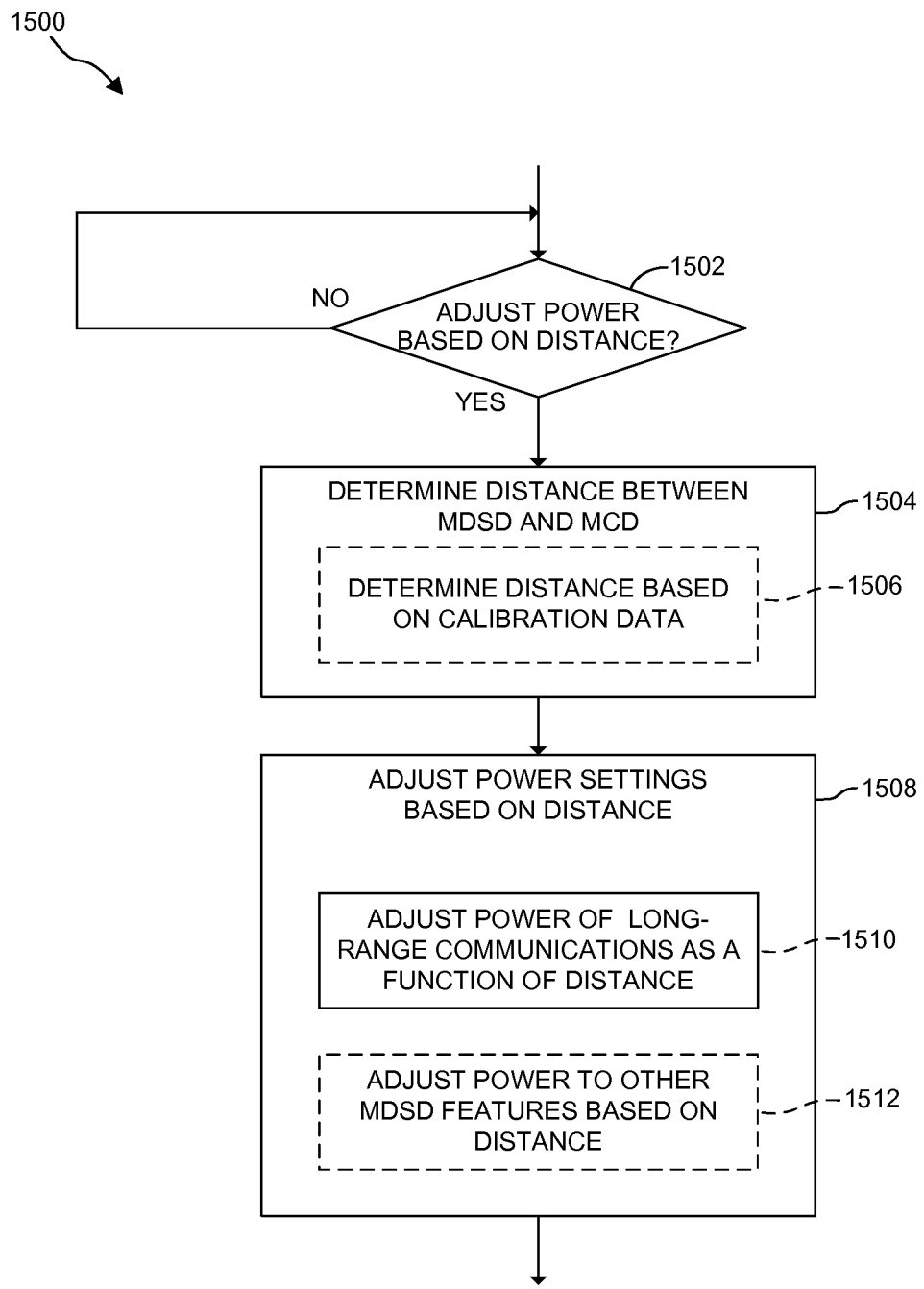
FIG. 15 is simplified flow diagram of one embodiment of a method for adjusting power settings that may be executed by the mobile data storage device of FIG. 4.

Referring now to FIG. 15, in some embodiments, the mobile data storage device 102 may also execute a method 1500 for adjusting power settings of the mobile data storage device 102. The method 1500 begins with block 1502 in which the mobile data storage device 102 determines whether to adjust power settings of the mobile data storage device 102 based on a distance between the mobile data storage device 102 and the mobile communication device 104. If so, the method 1500 advances to block 1504 in which the mobile data storage device 102 determines a distance or range between the devices 102, 104. As discussed above, the range or distance determined in block 1504 may be embodied as a distance value (e.g., in meters) or may be embodied as a value indicative of such distance. For example, in some embodiments, the mobile data storage device 102 is configured to determine whether the mobile communication device 104 is within the reference security range relative to the mobile data storage device 102 based on a received signal strength indicator (RSSI) measurement of the wireless control link 110. Alternatively, the mobile data storage device 102 may determine a current location of the device 102 using, for example, the global positioning system (GPS) circuit 428 and a current location of the mobile communication device 104 (e.g., the mobile data storage device 102 may receive data indicative of the location of the mobile communication device 104 over the wireless data link 112) and determine a distance between the devices 102, 104 based on such current locations. Further still, the mobile data storage device 102 may use other methodologies, such as cellular triangulation or wireless access point location determination, to determine the relative distance between the devices 102, 104. In embodiments in which the distance determination functionality has been calibrated as discussed above with regard to method 1200 of FIG. 12, the determined distance is adjusted or otherwise determined based on the calibration data generated in block 1506 using the method 1200 as discussed above.

Subsequently, in block 1508, the mobile data storage device 102 is configured to adjust the power settings of the device 102 based on the determined distance or range between the devices 102, 104. For example, in block 1510, the mobile data storage device 102 may adjust the power of the long-range communication circuitry 324 based on the distance between the devices 102, 104 (e.g., the power of the long-range communication circuitry 324 may be reduced as the distance between the devices 102, 104 is reduced). Additionally or alternatively, the mobile data storage device 102 may be configured to adjust other power functions or features based on the distance or range between the devices 102, 104 in block 1512.

Figure 16:
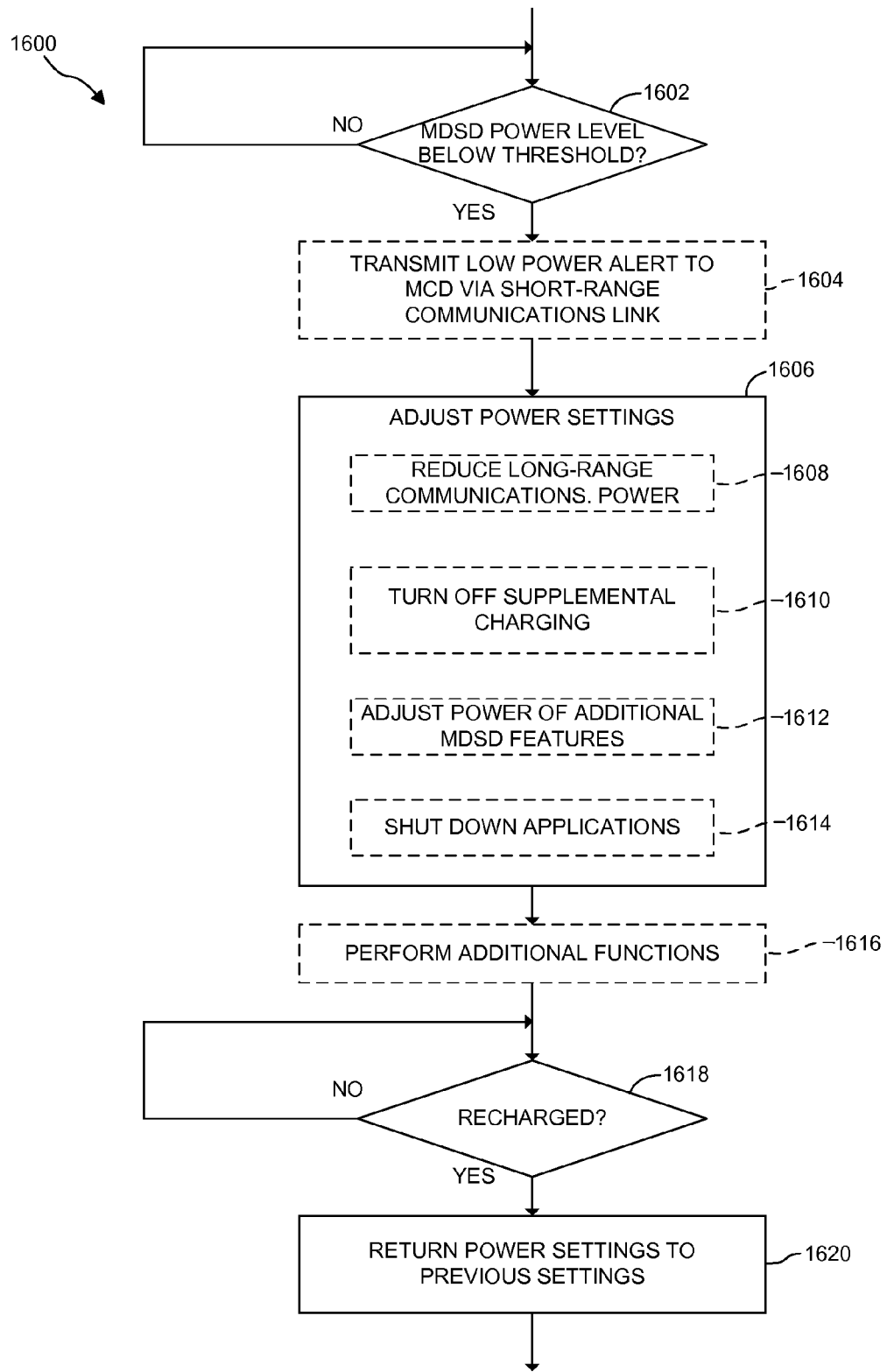
FIG. 16 is simplified flow diagram of one embodiment of a method for monitoring a power source that may be executed by the mobile data storage device of FIG. 4.

Referring now to FIG. 16, in some embodiments, the mobile data storage device 102 may be configured to execute a method 1600 for monitoring a power source (e.g., the battery 442) of the device 102. The method 1600 begins with block 1602 in which the mobile data storage device 102 determines whether the power level of the battery 442 (or other power source) is below a reference threshold level. The reference threshold level may be selected to be any threshold level depending on the particular implementation. In one particular embodiment, the reference threshold level is selected such that the core functionality of the mobile data storage device can be maintained at the reference threshold level (e.g., to maintain the wireless control link 110 and data storage functions).

If the mobile data storage device 102 determines that the power level of the battery 442 or other power source is below the reference threshold value, the method 1600 advances to block 1604. In some embodiments, the mobile data storage device 102 may be configured to transmit an alert to the mobile communication device 104 over the wireless control link 110 to indicate that the power level of the battery 442 is below the reference threshold in block 1304. Subsequently, in block 1606, the mobile data storage device 102 adjusts power settings of the device 102 so as to preserve the power of the battery 442 or other power source for core functions of the device 102. For example, in block 1608, the mobile data storage device may reduce the power of the long-range communication circuit 324 or otherwise disable the wireless data link 112. Additionally, in some embodiments, the mobile data storage device 102 may have a supplemental power charging port, which may be used to charge the mobile communication device 104 and other electronic devices. In such embodiments, the mobile data storage device 102 may be configured to turn off such supplemental charging in block 1610 in response to the power level of the battery 442 or other power source being below the reference threshold value. Additionally or alternatively, the mobile data storage device 102 may reduce or otherwise adjust power to other circuits or devices of the mobile data storage device 102 in block 1612 to thereby preserve power. Further, in some embodiments, the mobile data storage device 102 may shut down applications (e.g., non-critical applications) currently being executed on the mobile data storage device 102 in block 1614. Additionally, in some embodiments, the mobile data storage device 102 may perform additional functions, which may be not be related to power management or power saving functionality, based on the determined power level of the battery 442 in block 1616. Such additional functions may include, for example, storing critical data, backing up data out-of-sequence, and/or other functions.

Subsequently, in block 1618, the mobile data storage device 102 monitors the power level of the battery 442 or other power source to determine if the battery 442 has been recharged to a level above the reference threshold level. If so, the mobile data storage device 102 returns the power settings to the previous settings in block 1620.

Figure 17:
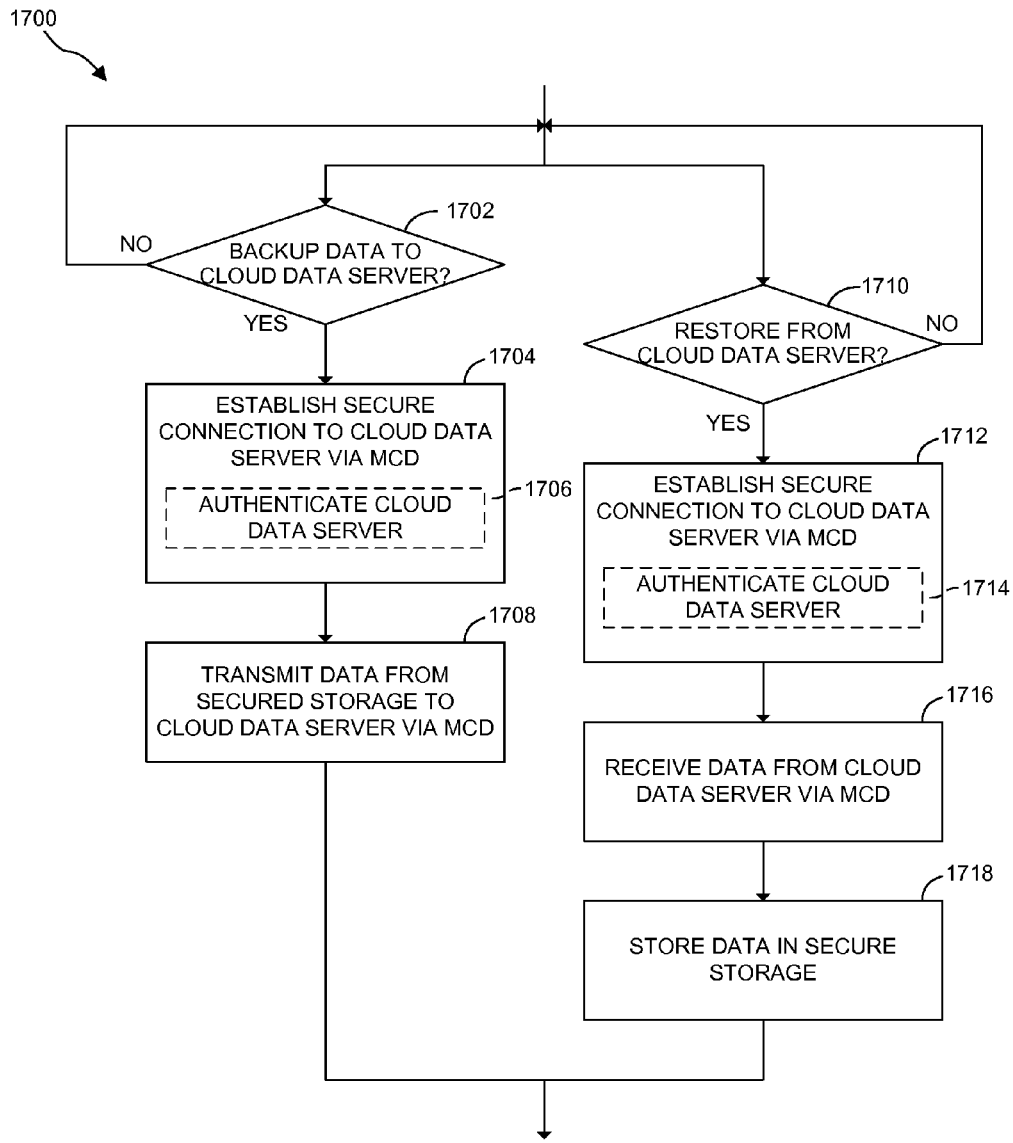
FIG. 17 is a simplified flow diagram of one embodiment of a method for communicating with a remote data server that may be executed by the mobile data storage device of FIG. 4.

As discussed above, in some embodiments, the system 100 may include the cloud data server 300. In such embodiments, the mobile data storage device 102 may be configured to backup data to the cloud data server 300 and/or retrieve data therefrom. To do so, the mobile data storage device 102 may execute a method 1700 for communicating with the data server 300 using the mobile communication device 104 as an intermediary as shown in FIG. 17. The method 1700 begins with blocks 1702 and 1710. In block 1702, the mobile data storage device 102 determines whether to backup data to the cloud data server 300. As discussed above, the mobile data storage device 102 may determine to perform data backup procedures periodically, in response to a command from a user of the mobile communication device 104, or in response to some other criteria (e.g., the volume of data stored on the mobile data storage device, the time since the last backup, etc.). Additionally, as discussed above, the mobile data storage device 102 may be configured to backup all data stored on the device 104 or backup only a portion of the data stored on the device 104. Further, critical or important data may be backed-up to the cloud data server 300 more often than less important or critical data.

If the mobile data storage device 102 determines to perform a backup procedure in block 1702, the method 1700 advances to block 1704 in which the mobile data storage device 102 establishes a secure connection to the cloud data server 300. To do so, the mobile data storage device 102 uses the mobile communication device 104 to establish the wireless data links 222, 232 to the cloud data server 300. In some embodiments, the mobile data storage device 102 may also authenticate the cloud data server 300 in block 1706. To do so, the mobile data storage device 102 may utilize any suitable authentication procedure to verify the identity of the data server 300. For example, in some embodiments, the cloud data server 300 may transmit a cryptographically signed certificate to the mobile data storage device 102 such that the device 102 may authenticate the cloud data server 300.

In block 1708, the mobile data storage device 102 transmits the data to be backed up to the cloud data server 300 via the mobile communication device 104 and the wireless data links 112, 222, 232. In some embodiments, the mobile data storage device 102 is configured to encrypt the data prior to transmitting the data to the data server 300. In such embodiments, the cloud data server 300 may store the data in the encrypted state in an associated data storage.

Referring back to block 1710, as discussed above, the mobile data storage device 102 may also retrieve data from the cloud data server 300. In particular, if the mobile data storage device 102 is lost or stolen, a user may purchase a new mobile data storage device 102 and restore the data to the newly purchased mobile data storage device 102 from the data server 300. If so, the method 1700 advances to block 1712 in which the mobile data storage device 102 uses the mobile communication device 104 to establish the wireless data links 222, 232 to the cloud data server 300. In some embodiments, the mobile data storage device 102 may also authenticate the cloud data server 300 in block 1714 as discussed above.

In block 1416, the cloud data server 300 transmits the requested data to the mobile communication device 104, which in turn transmits the requested data to the mobile data storage device 102 for storage therein in block 1716. As discussed above, in the illustrative embodiment, the cloud data server 300 stores the data in an encrypted state. The mobile data storage device 102 subsequently stores the data in the encrypted state in the data storage 406 in block 1718. In this way, new mobile data storage devices 102 may be repopulated with data such that no data is lost in the event that the user loses the original mobile data storage device 102 or the device 102 is stolen.

Figure 18:
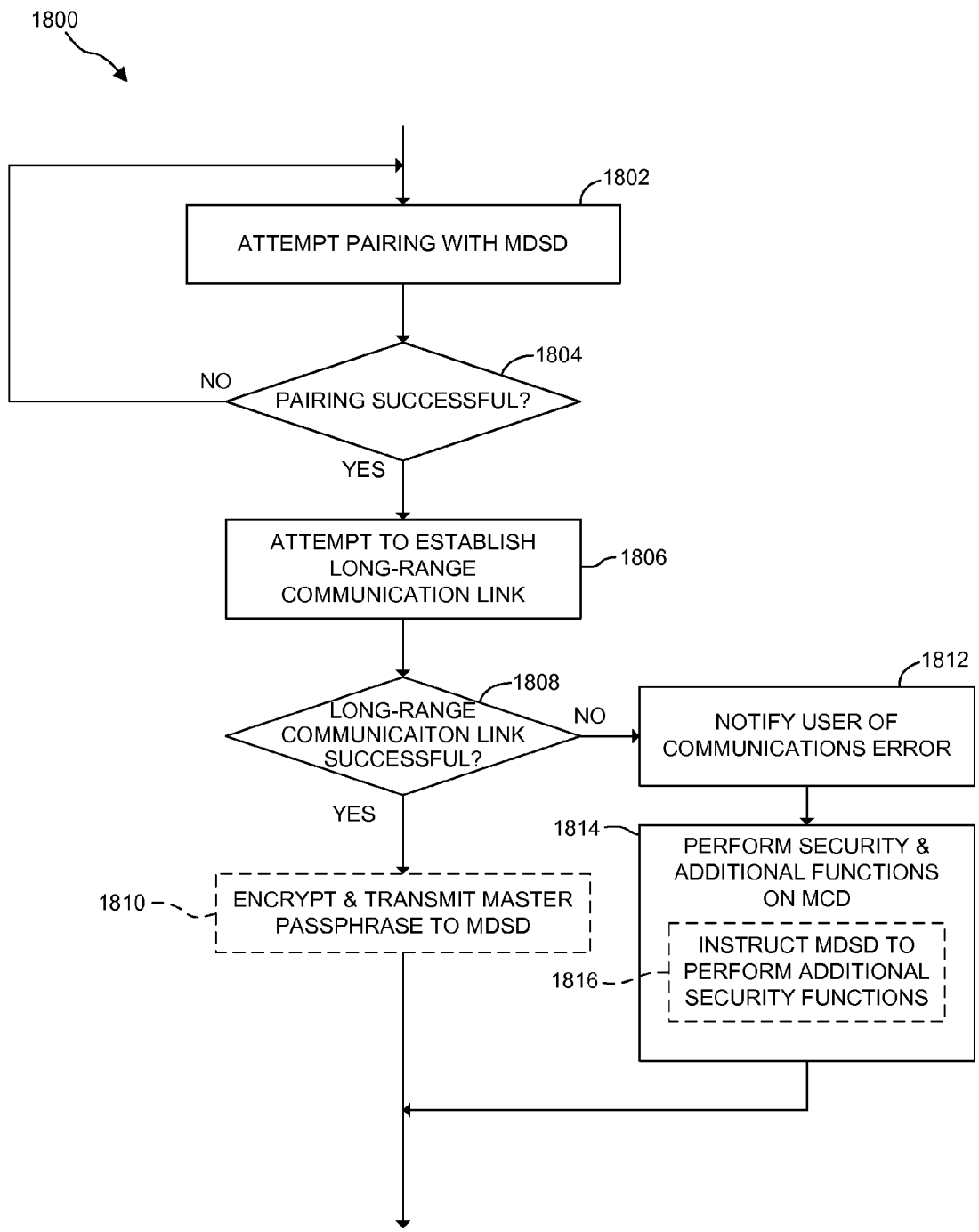
FIG. 18 is a simplified flow diagram of one embodiment of a method for establishing communication links with the mobile data storage device of FIG. 4, which may be executed by the mobile communication device of FIG. 7.

Referring now to FIG. 18, in operation, the mobile communication device 104 may execute a method 1800 to establish communications with the mobile data storage device 102. The 1800 begins with block 1802 in which the mobile communication device 104 determines whether to attempt to pair with the mobile data storage device 102. Again, as discussed above, the mobile communication device 104 and the mobile data storage device 102 are paired with each other in a 1:1 relationship during use such that the mobile data storage device 102 is configured to communicate only with a single mobile communication device 104. The mobile communication device 104 may attempt the pairing procedure with the mobile data storage device 102 in response to a selection or command provided by a user of the mobile communication device 104. In the illustrative embodiment, the devices 102, 104 utilize a Bluetooth® pairing procedure to establish the wireless control link 110 as discussed above. Of course, in other embodiments, the devices 102, 104 may use another suitable pairing procedure to establish the wireless control link 110, which may include for example a handshake procedure between the devices 102, 104.

In block 1804, the mobile communication device 104 determines whether the pairing procedure was successful. If not, the method 1800 loops back to block 1802 wherein the pairing procedure may be attempted again. However, if the pairing procedure was successful, the method 1800 advances to block 1806 wherein the mobile communication device 104 attempts to establish the wireless data link 112 using the long-range communication circuit 724. As discussed above, the wireless data link 112 may be embodied as any type of long-range, high-bandwidth data communication link. In the illustrative embodiment, the mobile communication device 104 is configured to establish a Wi-Fi® communication data link with the mobile data storage device 102 in block 1806.

In block 1808, the mobile communication device 104 determines whether the wireless data link 112 has been successfully established. If not, the method 1800 advances to block 1812 in which the mobile communication device 104 notifies the user of the device 104 that an error has occurred in establishing the wireless data link. Additionally, in some embodiments, the mobile communication device 104 may perform other security functions such as disabling the wireless data link 112 in block 1814. Further, if the wireless control link 110 is active, the mobile communication device 104 may instruct the mobile data storage device 102 to perform additional security functions such as disabling the long-range communication circuit 324, encrypting unencrypted data, and/or the like in block 1816.

If, however, the wireless data link 112 was successfully established, the method 1800 advances to block 1810 in which the master passphrase is transmitted to the mobile data storage device 102. In some embodiments, the mobile communication device 104 may be configured to encrypt the master passphrase prior to transmitting the passphrase to the mobile data storage device 102.

Figure 19:
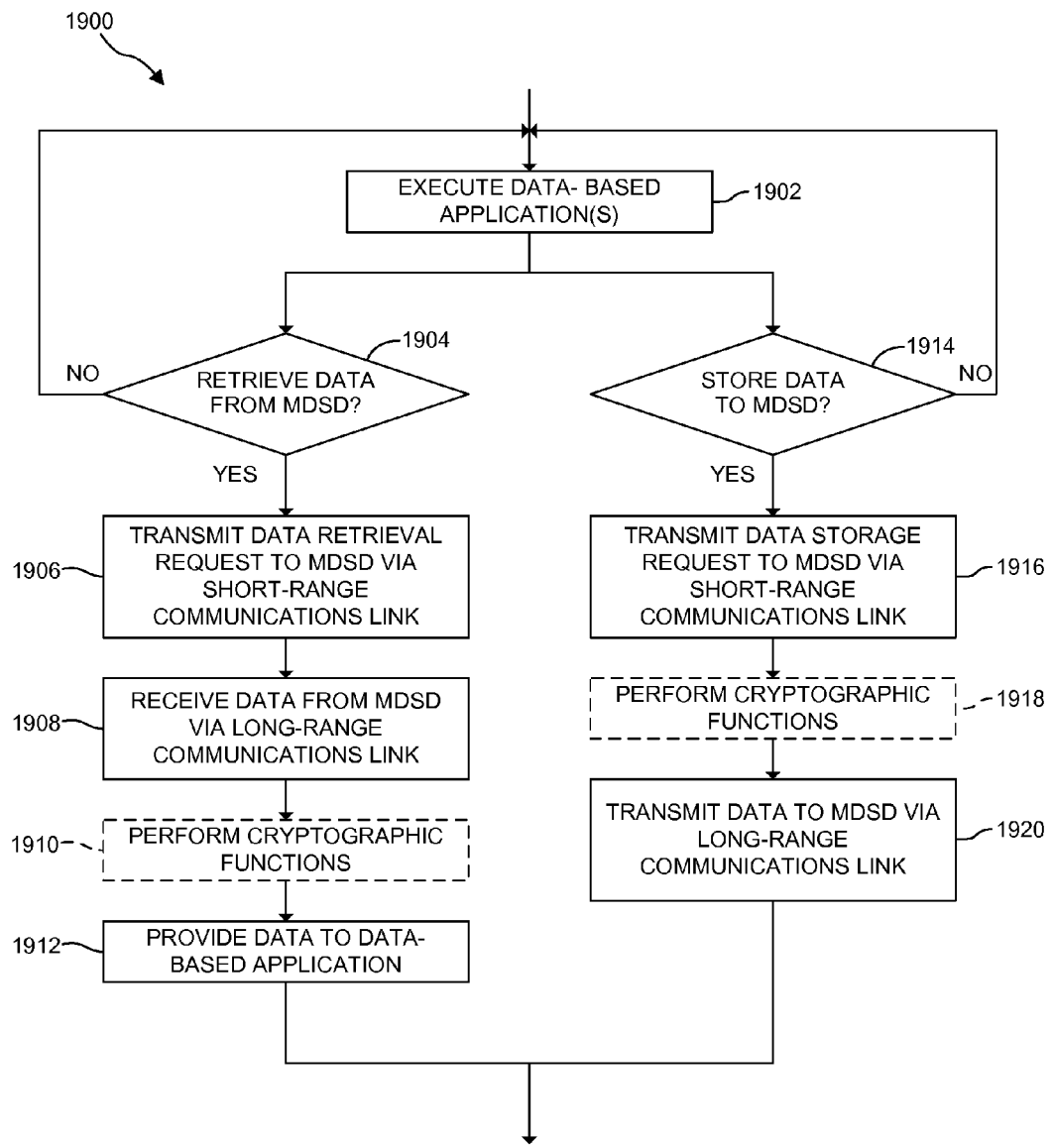
FIG. 19 is a simplified flow diagram of one embodiment of a method for performing data functions of data-based applications that may be executed by the mobile communication device of FIG. 7.

Referring now to FIG. 19, in use, the mobile communication device 104 may execute a method 1900 for performing data functions of the data-based applications 820 executed on the mobile communication device 104. The method 1900 begins with block 1902 in which one or more data-based applications are executed on the mobile communication device 104. As discussed above, the data-based applications may be embodied as any type of application that accesses, generates, stores, or otherwise uses data, which may be stored on the mobile data storage device 102. In some embodiments, the data-based applications 820 are standard applications that are not specifically designed for use with the mobile data storage device 102. Rather, the data management module 802 facilitates the storage and retrieval of the data used by use data-based applications 820 to/from the mobile data storage device 102 as discussed above.

In blocks 1904, 1914, the mobile communication device 104 determines whether the data-based applications 820 are requesting performance of a data function such as the retrieval or storage of data. For example, in block 1904, the mobile communication device 104 (i.e., the data management module 802) determines whether one or more of the data-based applications 820 has requested to retrieve data. If so, the method 1900 advances to block 1906 in which the mobile communication device 104 transmits a data retrieval request to the mobile data storage device 102 over the wireless control link 110. The data retrieval request may include data or information that identifies the requested data. In response, the mobile data storage device 102 locates, retrieves, and transmits the requested data to the mobile communication device 104 over the wireless data link 112, which is received by the mobile communication device 104 in block 1908. In embodiments, wherein the requested data is transmitted in an encrypted state, the mobile communication device 104 decrypts the received data in block 1910 and provides the data to the requesting data-based application 720 in block 1912.

Referring back to block 1914, the mobile communication device 104 (i.e., the data management module 802) determines whether one or more of the data-based applications 820 has requested to store data. If so, the method 1900 advances to block 1916 in which the mobile communication device 104 transmits a data storage request to the mobile data storage device 102 over the wireless control link 110. The data storage request may include data or information that identifies the data to be stored, the location in which to store the data, and/or other metadata associated with the data to be stored. In some embodiments, the mobile communication device 104 is configured to encrypt the data to be stored in block 1918 prior to transmitting the data to the mobile data storage device 102 over the wireless data link 112 in block 1920.

Figure 20:
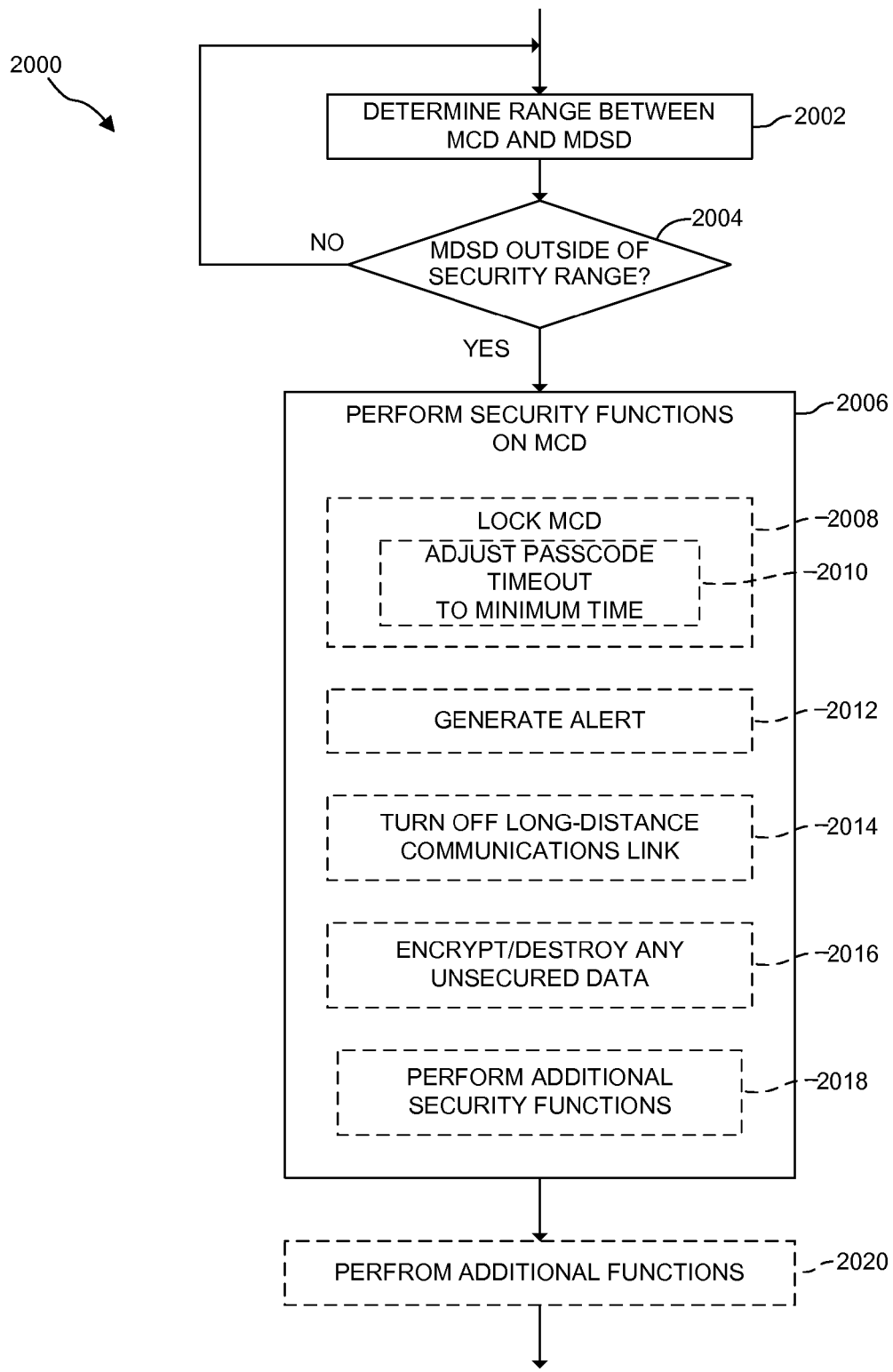
FIG. 20 is a simplified flow diagram of one embodiment of a method for managing security functions that may be executed by the mobile communication device of FIG. 7.
Figure 21:
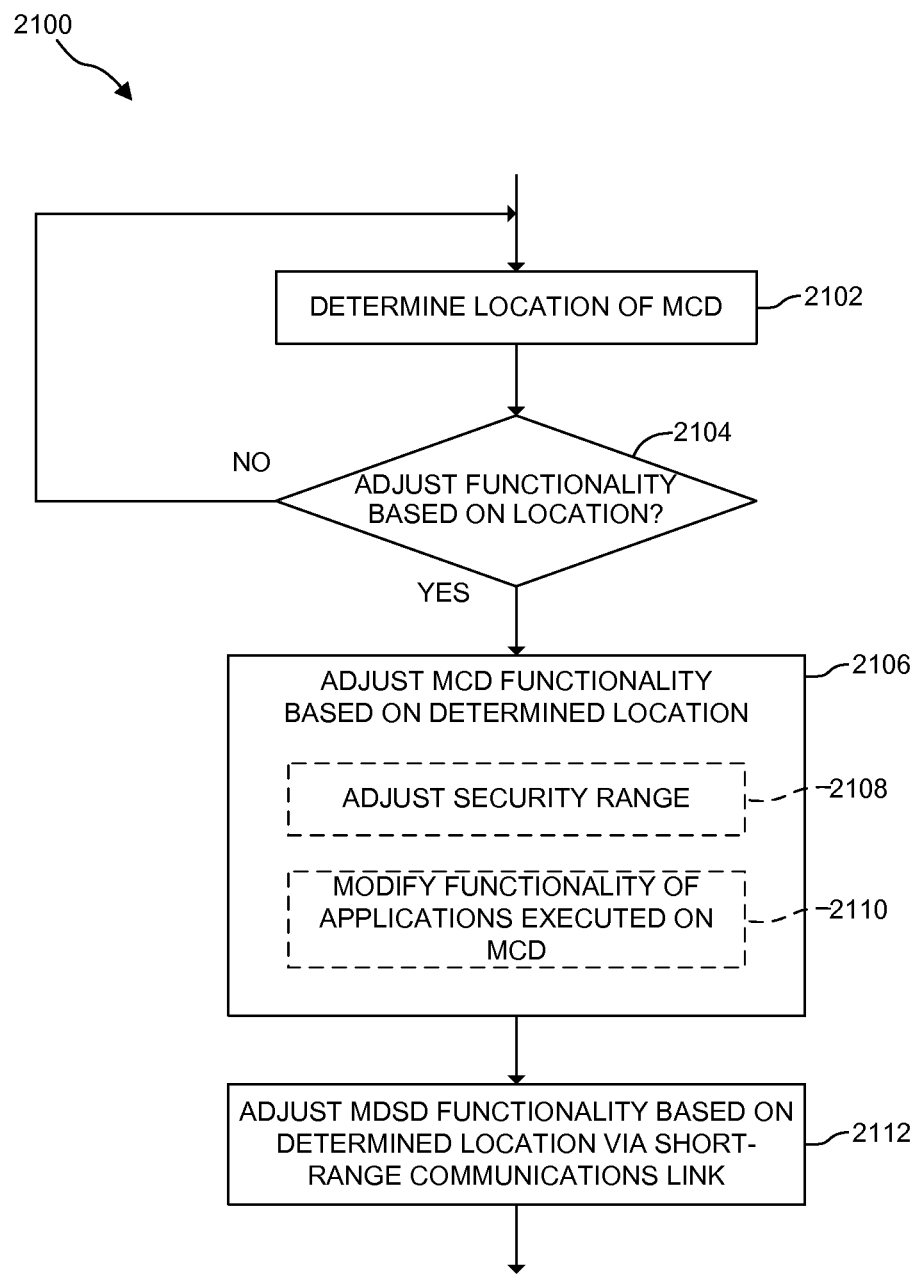
FIG. 21 is a simplified flow diagram of one embodiment of a method for managing location-based functionality that may be executed by the mobile communication device of FIG. 7.

Referring now to FIG. 20, in some embodiments, the mobile communication device 104 may be configured to execute a method 2000 for managing security functions of the mobile communication device 104. In particular, in some embodiments, the mobile communication device 104 may be configured to determine whether the mobile data storage device 102 and the mobile communication device 104 are separated from each other by a distance greater than the reference security communication range. To do so, the mobile communication device 104 may determine a range or distance between the mobile communication device 104 and the mobile data storage device 102 in block 2002. As discussed above, the range or distance determined in block 2002 may be embodied as a distance value (e.g., in meters) or may be embodied as a value indicative of such distance. For example, in some embodiments, the mobile communication device 104 is configured to determine whether the mobile data storage device 102 is within the reference security range relative to the mobile communication device 104 based on a received signal strength indicator (RSSI) measurement of the wireless control link 110. Alternatively, the mobile communication device 104 may determine a current location of the device 104 using, for example, the global positioning system (GPS) circuit 628 and a current location of the mobile data storage device 102 (e.g., the mobile communication device 104 may receive data indicative of the location of the mobile data storage device 102 over the wireless data link 112) and determine a distance between the devices 102, 104 based on such current locations. Further still, the mobile communication device 104 may use other methodologies, such as cellular triangulation or wireless access point location determination, to determine the relative distance between the devices 102, 104.

If the mobile communication device 104 determines that the mobile data storage device is outside the reference security communication range in block 2004, the method 2000 advances to block 2006 in which the mobile communication device 104 may perform one or more security functions. For example, in block 2008, the mobile communication device 104 may lock the mobile communication device 104 such that a user must enter the passcode to unlock the device 104. Additionally or alternatively, the security application 806 of the mobile communication device 104 may adjust the passcode timeout length to the minimum time available such that the passcode requirement is implemented as quickly as possible in block 2010.

Additionally, in some embodiments, the mobile communication device 104 may generate a local alarm in block 2012, which may be embodied as an audible alarm, a visual alarm, and/or a tactile alarm. Additionally or alternatively, the mobile communication device 104 may turn off or otherwise disable the wireless data link 112 in block 2014 and secure any unsecured data (e.g., encrypt any unencrypted data) in block 2016. Additionally, the mobile communication device 104 may perform additional or other security functions in block 2018. Further, in some embodiments, the mobile communication device 104 may be configured to perform additional functions, which may be unrelated or not directly related to security functions, in block 2020. For example, the mobile communication device 104 may attempt to reestablish the wireless control link 110 or perform other functions in response to determining that the mobile data storage device 102 is outside the reference security communication range.

Referring now to FIG. 2100, in some embodiments, the mobile communication device 104 may also execute a method 2100 for managing location-based functionality of the mobile communication device 104. The method 2100 begins with block 2102 in which the mobile communication device 104 determines a current location of the device 104. As discussed above, the mobile communication device 104 may use any suitable methodology to determine the current location of the device 104. For example, in some embodiments, the mobile communication device 104 may include the global positioning system (GPS) circuitry 628, which may generate data indicative of the current location of the device 104. Additionally or alternatively, the mobile communication device 104 may utilize the cellular communication circuitry 626 to determine a current location of the device 104 based on a cellular triangulation process. Yet further, in other embodiments, the mobile communication device 104 may determine the current location based on a wireless access point location determination methodology or other methodology and/or devices as discussed above.

In block 2104, the mobile communication device 104 determines whether to adjust functionality of the mobile communication device 104 based on the current location. For example, if the mobile communication device 104 determines that the mobile communication device 104 is at the home of the user of the device 104, the mobile communication device 104 may adjust particular functions of the device 104 relative to other locations, such as the work location of the user in a manner similar to the mobile data storage device 102 discussed above in regard to FIG. 13. To do so, in block 2106, the mobile communication device 104 adjusts the functionality of the device 104 based on the determined location. For example, in block 2108, the mobile communication device 104 may adjust the reference security range. In this way, the reference security range may be increased in trusted locations (e.g., the user's home) and decreased in untrusted locations (e.g., in public places). Additionally, in some embodiments, the mobile communication device 104 adjusts the functionality of one or more of the data-based applications 820 executed on the mobile communication device 104 in block 2110. For example, the availability of data stored on the mobile data storage device 102 may be controlled based on the determined location of the mobile communication device 104.

Additionally, in some embodiments (e.g., wherein the mobile data storage device 102 cannot determine its current location), the mobile communication device 104 may further adjust the functionality of the mobile data storage device 102 by transmitting control signals via the wireless control link 110 in block 2112. For example, the mobile communication device 104 may instruct the mobile data storage device 102 to adjust the reference security communication range, adjust the power of the long-range communication circuit 324, and/or adjust other functionality of the mobile data storage device 102 based on the determined location.

Figure 22:
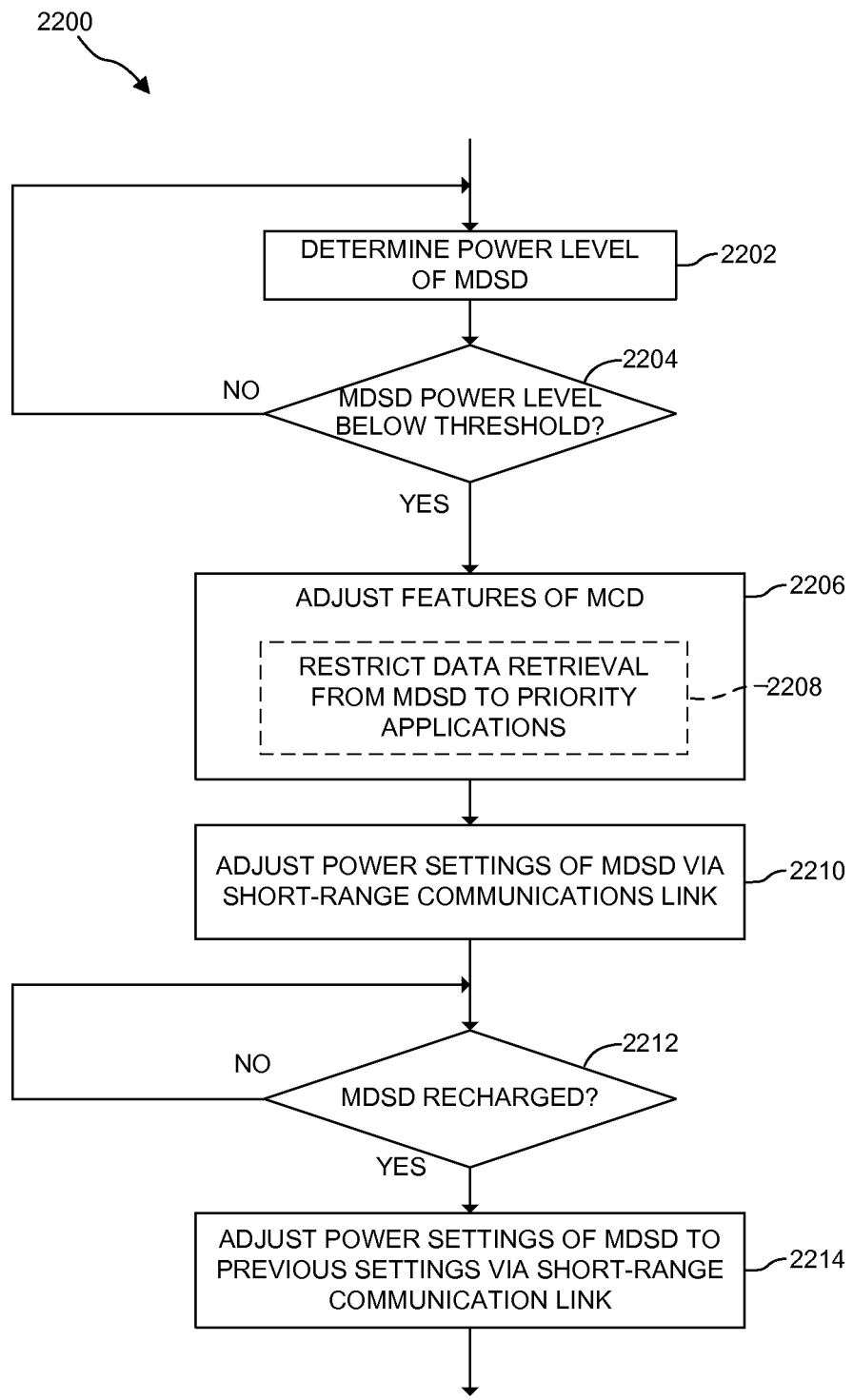
FIG. 22 is simplified flow diagram of one embodiment of a method for adjusting power settings that may be executed by the mobile communication device of FIG. 7.

Referring now to FIG. 22, in some embodiments, the mobile communication device 104 may also be configured execute a method 2200 for monitoring a power source (e.g., the battery 442) of the mobile data storage device 102 and adjust features of the mobile communication device 104 based on a determined power level of the power source. The method 2200 begins with block 2202 in which the mobile communication device 104 determines whether the power level of the battery 442 (or other power source) of the mobile data storage device 102 is below a reference threshold level. As discussed above, the reference threshold level may be selected to be any threshold level depending on the particular implementation. In one particular embodiment, the reference threshold level is selected such that the core functionality of the mobile data storage device 102 can be maintained at the reference threshold level (e.g., to maintain the wireless control link 110 and data storage functions). The mobile communication device 104 may determine the power level of the mobile data storage device 102 based on communications received from the device 102 over the wireless control link 110. The mobile data storage device 102 may be configured to transmit periodically the power level of the battery 442 or may transmit the power level to the mobile communication device 104 in response to an inquiry sent by the device 104 over the wireless control link 110.

If the mobile communication device 104 determines that the power level of the battery 442 or other power source of the mobile data storage device 102 is below the reference threshold value in block 2204, the method 2200 advances to block 2206 in which the mobile communication device 104 adjusts features of the device 104 based on the power level of the power source of the mobile data storage device 102. For example, in some embodiments, the mobile communication device 104 may be configured to restrict data retrieval from the mobile data storage device 102 to priority applications executed on the mobile communication device 104 in block 2208. In block 22210, the mobile communication device 104 may also adjust power settings of the mobile data storage device 102 by transmitting instructions via the wireless control link 110. For example, the mobile communication device 104 may instruct the mobile data storage device 102 to lower the output power of the long-range communication circuit 324.

Subsequently, in block 2012, the mobile communication device 104 monitors the power level of the battery 442 or other power source of the mobile data storage device 102 to determine if the battery 442 has been recharged to a level above the reference threshold level. If so, the mobile communication device 104 returns the power settings of the devices 102, 104 to the previous settings in block 2014.

Figure 23:
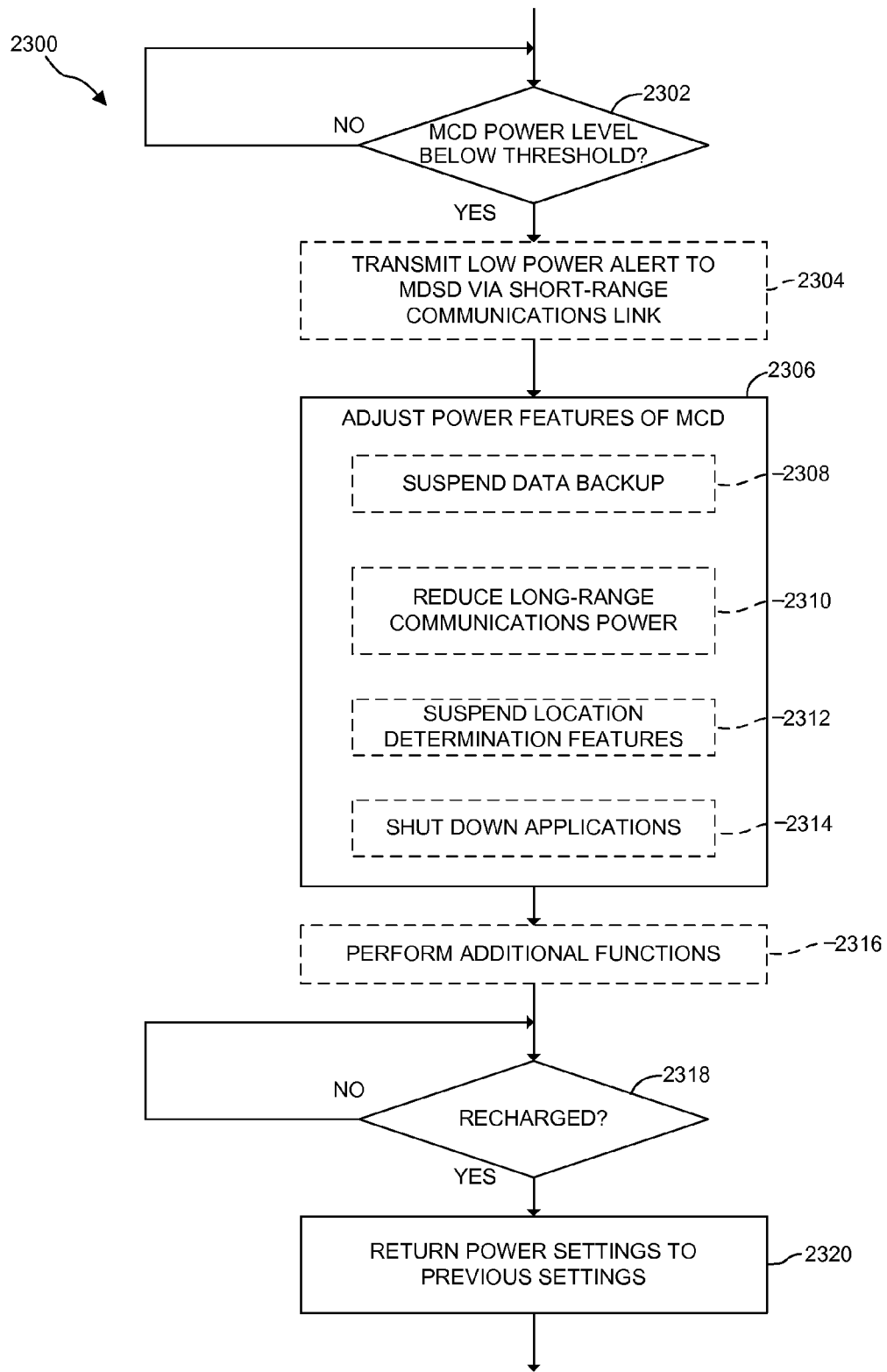
FIG. 23 is simplified flow diagram of one embodiment of a method for monitoring a power source that may be executed by the mobile data storage device of FIG. 7.

Referring now to FIG. 23, in some embodiments, the mobile communication device 104 may be configured to execute a method 2300 for monitoring a power source (e.g., the battery 742) of the device 104. The method 2300 begins with block 2302 in which the mobile communication device 104 determines whether the power level of the battery 742 (or other power source) is below a reference threshold level. The reference threshold level may be selected to be any threshold level depending on the particular implementation. In one particular embodiment, the reference threshold level is selected such that the core functionality of the mobile communication device 104 can be maintained at the reference threshold level (e.g., to maintain the wireless control link 110 and/or cellular communication functionality).

If the mobile communication device 104 determines that the power level of the battery 742 or other power source is below the reference threshold value, the method 2300 advances to block 2304. In some embodiments, the mobile communication device 104 may be configured to transmit an alert to the mobile data storage device 102 over the wireless control link 110 to indicate that the power level of the battery 742 is below the reference threshold in block 2304. Subsequently, in block 2306, the mobile communication device 104 adjusts power settings and/or features of the device 104 so as to preserve the power of the battery 742 or other power source for core functions of the device 104.

For example, in block 2308, the mobile communication device 104 may suspend data backup to the mobile data storage device 102 or other destination device (e.g., the remote data server 300). In so doing, the mobile communication device 104 may suspend all data backup or suspend only non-critical data backup based on, for example, user and device preferences. Additionally, in some embodiments, the mobile communication device 104 may reduce or otherwise adjust the power level of the long-range communication circuit 324 and/or otherwise disable the wireless data link 112. Further, in some embodiments, the mobile communication device 104 may suspend location determination features of the device 104 such as, for example, the global positioning system 728. Additionally, in some embodiments, the mobile communication device 104 may shut down applications (e.g., non-critical applications) currently being executed on the mobile communication device 104 in block 1614. Yet further, in some embodiments, the mobile communication device 104 may perform additional functions, which may be not be related to power management or power saving functionality, based on the determined power level of the battery 742 in block 2316. Such additional functions may include, for example, storing critical data, backing up data out-of-sequence, and/or other functions.

Subsequently, in block 2318, the mobile communication device 104 monitors the power level of the battery 742 or other power source to determine if the battery 742 has been recharged to a level above the reference threshold level. If so, the mobile communication device 104 returns the power settings to the previous settings in block 2320.

Figure 24:
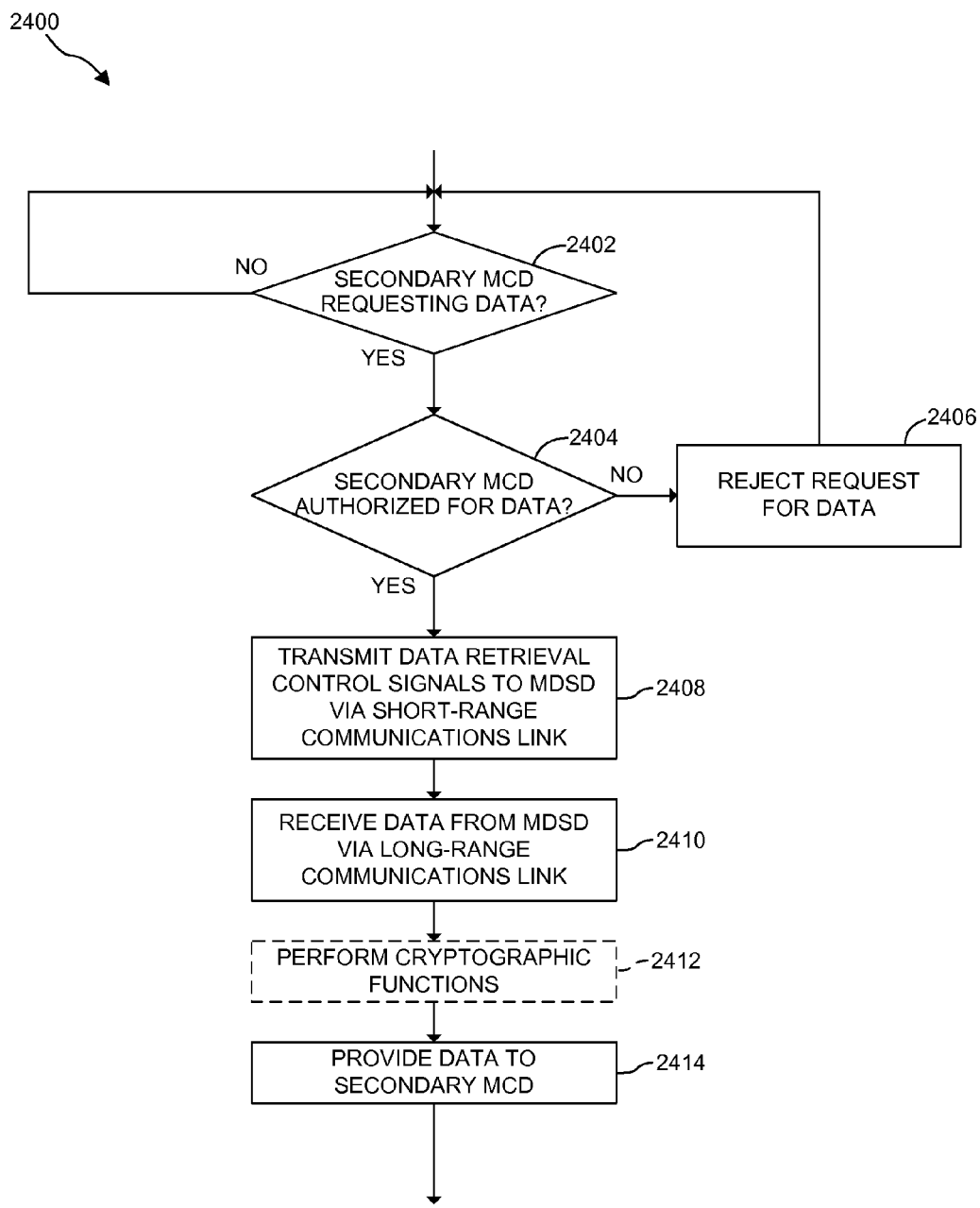
FIG. 24 is simplified flow diagram of one embodiment of a method for communicating data between the mobile data storage device of FIG. 4 and an additional mobile communication device using the mobile communication device of FIG. 7.

Referring now to FIG. 24, as discussed above, the mobile communication device 104 may communicate data stored on the mobile data storage device 102 to additional mobile communication device 204 in some embodiments (e.g., the mobile communication device 104 may act as an intermediary between the mobile data storage device 102 and the additional mobile communication device 204). To do so, the mobile communication device 104 may execute a method 2400 for communicating data to the secondary or additional mobile communication device 204. The method 2400 begins with block 2402 in which the mobile communication device 104 determines whether the secondary mobile communication device 204 is requesting data from the mobile data storage device 102. If so, the mobile communication device 104 determines whether the secondary mobile communication device 204 is authorized for the requested data in block 2404. Such authorization may depend, for example, on the type of data being requested. For example, in some embodiments, the mobile data storage device 102 may flag or otherwise indicate particular data that is available for public sharing. If the secondary mobile communication device 204 is not authorized for the requested data, the method 200 advances to block 2406 in which the request for the data is rejected by the mobile communication device 104.

However, if the secondary mobile communication device 204 is authorized for the requested data, the method 2000 advances to block 2408 in which the mobile communication device 104 transmits a data retrieval request to the mobile data storage device 102 over the wireless control link 110. The data retrieval request may include data or information that identifies the requested data. In response, the mobile data storage device 102 locates, retrieves, and transmits the requested data to the mobile communication device 104 over the wireless data link 112, which is received by the mobile communication device 104 in block 2410. In embodiments, wherein the requested data is transmitted in an encrypted state, the mobile communication device 104 decrypts the received data in block 2412 and provides the data to the requesting secondary mobile data communication device 204 in block 2414.

Figure 25:
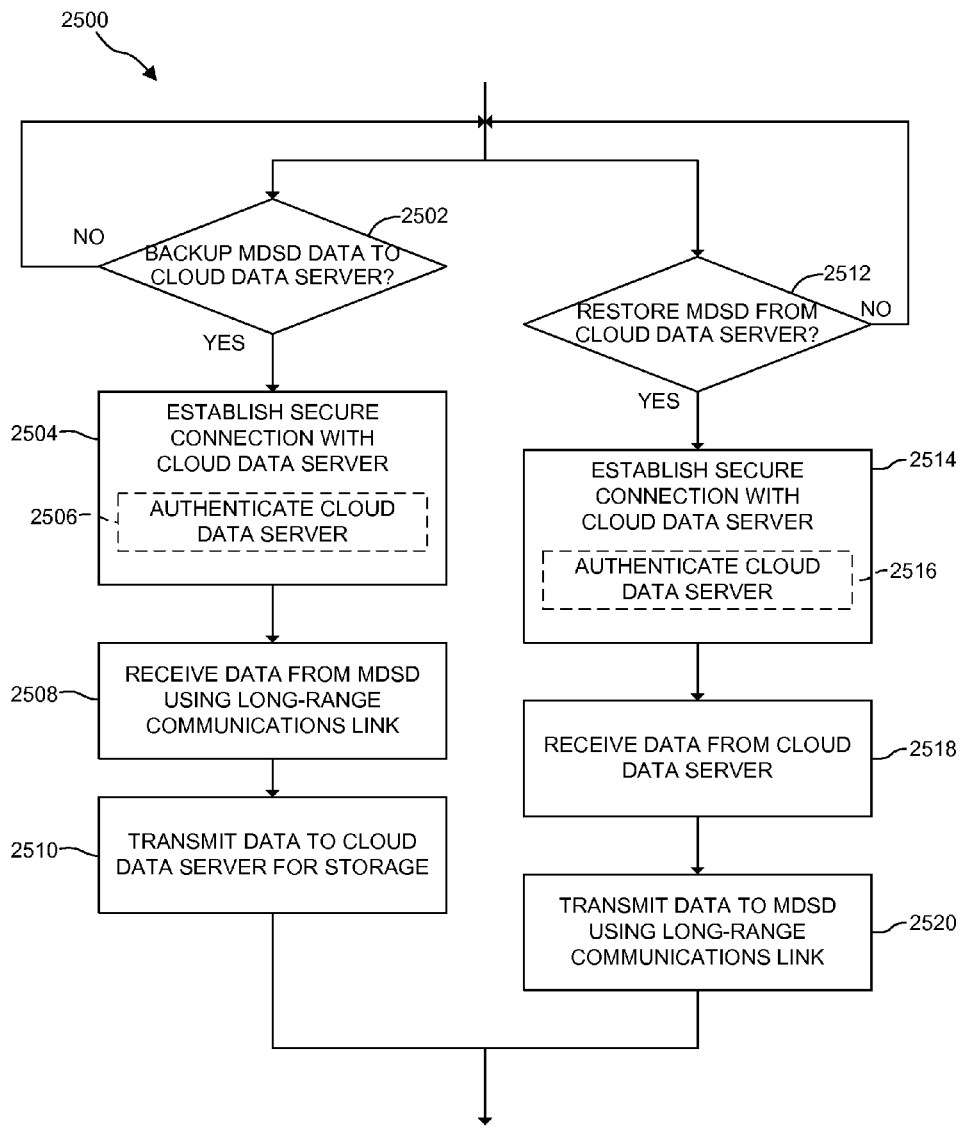
FIG. 25 is a simplified flow diagram of one embodiment of a method for communicating with a remote data server that may be executed by the mobile communication device of FIG. 7.

As discussed above, the system 100 may include the cloud data server 300 in some embodiments. In such embodiments, the mobile communication device 104 facilitates the backup of data to the cloud data server 300 and or the retrieval of data therefrom. To do so, the mobile communication device 104 may execute a method 2500 for facilitating communications with the cloud data server 300 as shown in FIG. 25. The method 2500 begins with blocks 2502 and 2512. In block 2502, the mobile communication device 104 determines whether to backup data from the mobile data storage device 102 to the cloud data server 300. For example, the mobile communication device 104 may receive a request from the mobile data storage device 102 to backup data to the data server 300. If so, the method 2500 advances to block 2504 in which the mobile data storage device 102 establishes a secure connection with the cloud data server 300 over the network 220. In some embodiments, the mobile communication device 104 may also authenticate the cloud data server 300 in block 2506. To do so, the mobile communication device 104 may utilize any suitable authentication procedure to verify the identity of the data server 300. For example, in some embodiments, the cloud data server 300 may transmit a cryptographically signed certificate to the mobile communication device 104 such that the device 104 may authenticate the cloud data server 300.

In block 2508, the mobile communication device 104 retrieves the data to be backed-up from the mobile data storage device 102. In some embodiments, the mobile data storage device 102 transmits the data to the mobile communication device 104 in an encrypted state over the wireless data link 112. The mobile communication device 104 transmits the encrypted data (or unencrypted data) to the cloud data server 300 for storage thereon in block 2510.

Referring back to block 2512, as discussed above, the data stored on the cloud data server 300 may also be used to restore or repopulate the mobile data storage device 102. If so, the method advances to block 2514 in which the mobile data storage device 102 establishes a secure connection with the cloud data server 300 over the network 220. As discussed above, in some embodiments, the mobile communication device 104 may also authenticate the cloud data server 300 in block 2516.

In block 2518, the mobile communication device 104 retrieves the encrypted data from the cloud data server 300 that will be used to repopulate the mobile data storage device 102 (e.g., a new or replacement mobile data storage device 102). As discussed above, the cloud data server 300 may store data thereon in an encrypted state to ensure the security of the data. As such, the mobile communication device 104 may subsequently transmit the encrypted (or unencrypted) data to the mobile data storage device 102 via the wireless data link 112 for storage thereon in block 2520. In this way, new or replacement mobile data storage devices 102 may be repopulated with data such that no data is lost in the event that the loser loses the original mobile data storage device 102 or the device 102 is stolen.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A method for secure mobile data storage, the method comprising:
    establishing, by a first mobile communication device, a wireless control link with a mobile data storage device using a short-range communication protocol, the wireless control link usable by the first mobile communication device to transmit control signals to the mobile data storage device;
    establishing, by the first mobile communication device, a first wireless data link with the mobile data storage device using a long-range communication protocol, the first wireless data link usable by the first mobile communication device to transfer data with the mobile data storage device in response to corresponding control signals transmitted to the mobile data storage device via the wireless control link;
    establishing, by the first mobile communication device, a second wireless data link with a second mobile communication device, the second wireless data link usable by the first mobile communication device to transfer data to the second communication device;
    receiving, by the first mobile communication device, a request for data from the second mobile communication device;
    transmitting, by the first mobile communication device, a control signal to the mobile data storage device using the wireless control link to request the data from the mobile data storage device;
    receiving, by the first mobile communication device, the requested data from the mobile data storage device using the first wireless data link; and
    transmitting, by the first mobile communication device, the received requested data to the second mobile communication device using the second wireless data link.

2. The method of claim 1, further comprising:
   determining whether a network connection between the first mobile communication device and the mobile data storage device is available over a network; and
   establishing, in response to determining that the network connection is available, a second wireless data link over the network between the mobile communication device and the mobile data storage device, the second wireless data link usable by the first mobile communication device to transfer data with the mobile data storage device in response to corresponding control signals transmitted to the mobile data storage device via the wireless control link.

3. The method of claim 1, further comprising copying, by the first mobile communication device, data stored on the mobile data storage device to a remote data server that is accessible by the first mobile communication device over a network.

4. The method of claim 3, wherein copying the data stored on the mobile data storage device comprises:
   transmitting, by the first mobile communication device, a control signal to the mobile data storage device using the wireless control link to request data from the mobile data storage device;
   receiving, by the first mobile communication device, the requested data from the mobile data storage device using the first wireless data link; and
   storing, by the first mobile communication device, the received requested data on a remote data server that is accessible via a network connection.

5. The method of claim 4, wherein copying the data stored on the mobile data storage device comprises periodically copying the data stored on the mobile data storage device to the remote data server.

6. The method of claim 4, wherein copying the data stored on the mobile data storage device comprises copying the data stored on the mobile data storage device (i) in response to a change in the data stored on the mobile data storage device, (ii) based on the type of data stored on the mobile data storage device, or (iii) based on the amount of data stored on the mobile data storage device.

7. The method of claim 1, further comprising:
   retrieving, by the first mobile communication device and over a network connection, data stored on a remote data server; and
   storing the retrieved data on the mobile data storage device, wherein storing the retrieved data comprises (i) transmitting, by the first mobile communication device, the retrieved data to the mobile data storage device using the first wireless data link and (ii) transmitting, by the first mobile communication device, a control signal to the mobile data storage device using the wireless control link to cause the mobile data storage device to store the retrieved data.

8. The method of claim 7, wherein retrieving the data stored on the remote data server comprising:
   determining, by the first mobile communication device, whether the mobile data storage device is a new mobile data storage device; and
   retrieving, by the first mobile communication device and over the network connection, data stored on the remote data server in response to determining the mobile data storage device is a new mobile data storage device.

9. A mobile communication device for secure mobile data storage, the mobile communication device comprising:
   processing circuitry; and
   a communication circuit controllable by the processing circuitry to:
      establish a wireless control link with a mobile data storage device using a short-range communication protocol, the wireless control link usable by the first mobile communication device to transmit control signals to the mobile data storage device,
      establish a first wireless data link with the mobile data storage device using a long-range communication protocol, the first wireless data link usable by the first mobile communication device to transfer data with the mobile data storage device in response to corresponding control signals transmitted to the mobile data storage device via the wireless control link,
      establish a second wireless data link with a second mobile communication device, the second wireless data link usable by the first mobile communication device to transfer data to the second communication device,
      receive a request for data from the second mobile communication device,
      transmit a control signal to the mobile data storage device using the wireless control link to request the data from the mobile data storage device,
      receive the requested data from the mobile data storage device using the first wireless data link, and
      transmit the received requested data to the second mobile communication device using the second wireless data link.

10. The mobile communication device of claim 9, wherein:
    the processing circuitry is configured to (i) determine whether a network connection between the first mobile communication device and the mobile data storage device is available over a network and (ii) control the communication circuit to establish, in response to a determination that the network connection is available, a second wireless data link over the network with the mobile data storage device, the second wireless data link usable by the first mobile communication device to transfer data with the mobile data storage device in response to corresponding control signals transmitted to the mobile data storage device via the wireless control link.

11. The mobile communication device of claim 9, wherein the communication circuit is controllable by the processing circuitry to copy data stored on the mobile data storage device to a remote data server that is accessible by the first mobile communication device over a network.

12. The mobile communication device of claim 11, wherein to copy the data stored on the mobile data storage device comprises to:
    transmit a control signal to the mobile data storage device using the wireless control link to request data from the mobile data storage device;
    receive the requested data from the mobile data storage device using the first wireless data link; and
    store the received requested data on a remote data server that is accessible via a network connection.

13. The mobile communication device of claim 12, wherein to copy the data stored on the mobile data storage device comprises to periodically copy the data stored on the mobile data storage device to the remote data server.

14. The mobile communication device of claim 12, wherein to copy the data stored on the mobile data storage device comprises to copy the data stored on the mobile data storage device (i) in response to a change in the data stored on the mobile data storage device, (ii) based on the type of data stored on the mobile data storage device, or (iii) based on the amount of data stored on the mobile data storage device.

15. The mobile communication device of claim 9, wherein the communication circuit is further controllable by the processing circuitry to:
retrieve, over a network connection, data stored on a remote data server; and
store the retrieved data on the mobile data storage device, wherein to store the retrieved data comprises to (i) transmit he retrieved data to the mobile data storage device using the first wireless data link and (ii) transmit a control signal to the mobile data storage device using the wireless control link to cause the mobile data storage device to store the retrieved data.

16. The mobile communication device of claim 15, wherein to retrieve the data stored on the remote data server comprising to:
determine whether the mobile data storage device is a new mobile data storage device; and
retrieve, over the network connection, data stored on the remote data server in response to determining the mobile data storage device is a new mobile data storage device.

17. A system for secure mobile data storage, the system comprising:
a first mobile communication device having a first communication circuit; and
a mobile data storage device to communicate with the first mobile communication device, the mobile data storage device having a data storage to store data and a second communication circuit configured to establish (i) a wireless control link with the first mobile communication device using a short-range communication protocol, the wireless control link usable by the mobile data storage device to receive control signals from the first mobile communication device and (ii) a first wireless data link with the first mobile communication device using a long-range communication protocol, the first wireless data link usable by the mobile data storage device to transfer data with the first mobile communication device in response to corresponding control signals received via the wireless control link,
wherein the first mobile communication device is to (i) establish a second wireless data link with a second mobile communication device, (ii) receive a request for data from the second mobile communication device, (iii) transmit a control signal to the mobile data storage device over the wireless control link to request the data from the mobile data storage device, (iii) receive the requested data from the mobile data storage device over the first wireless data link, and (iv) transmit the requested data to the second mobile communication device over the second wireless data link.

* * * * *